Jan. 2, 1951  R. S. SMITH  2,536,322
TRANSFER AND RECOVERY SYSTEM FOR VOLATILE LIQUIDS
Filed June 23, 1945  9 Sheets-Sheet 7
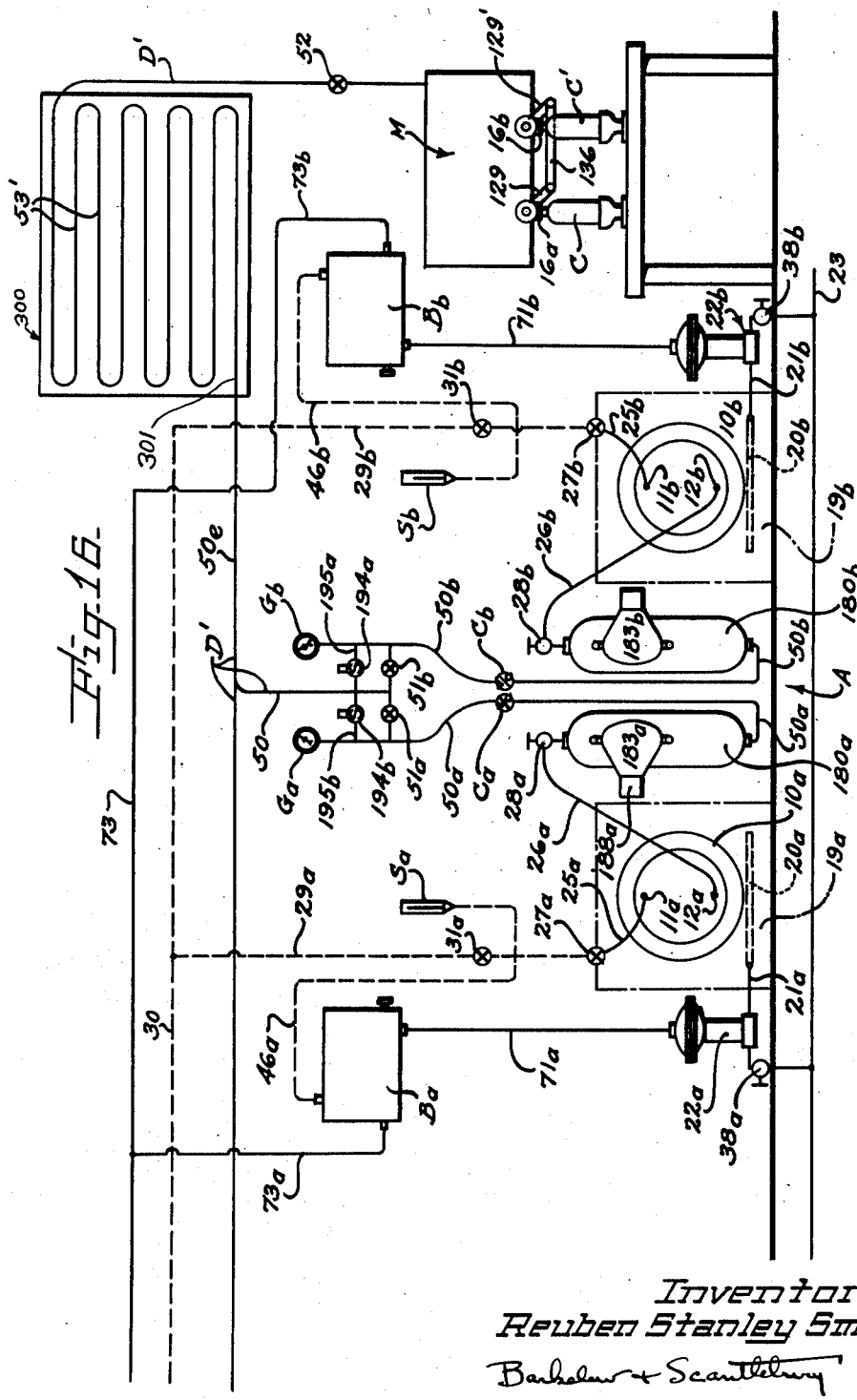
Inventor
Reuben Stanley Smith
Bartholow & Scantlebury
Attys.

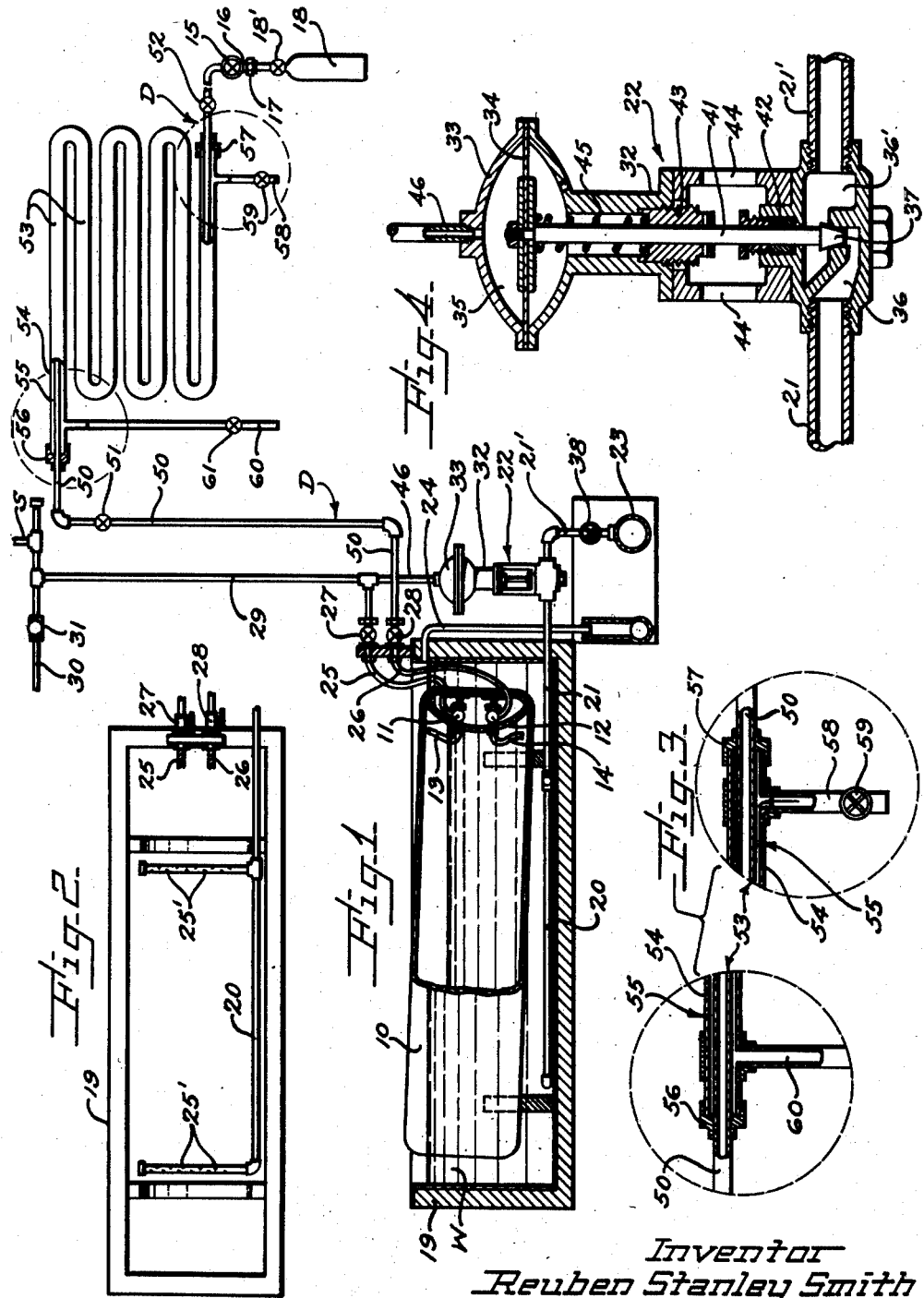

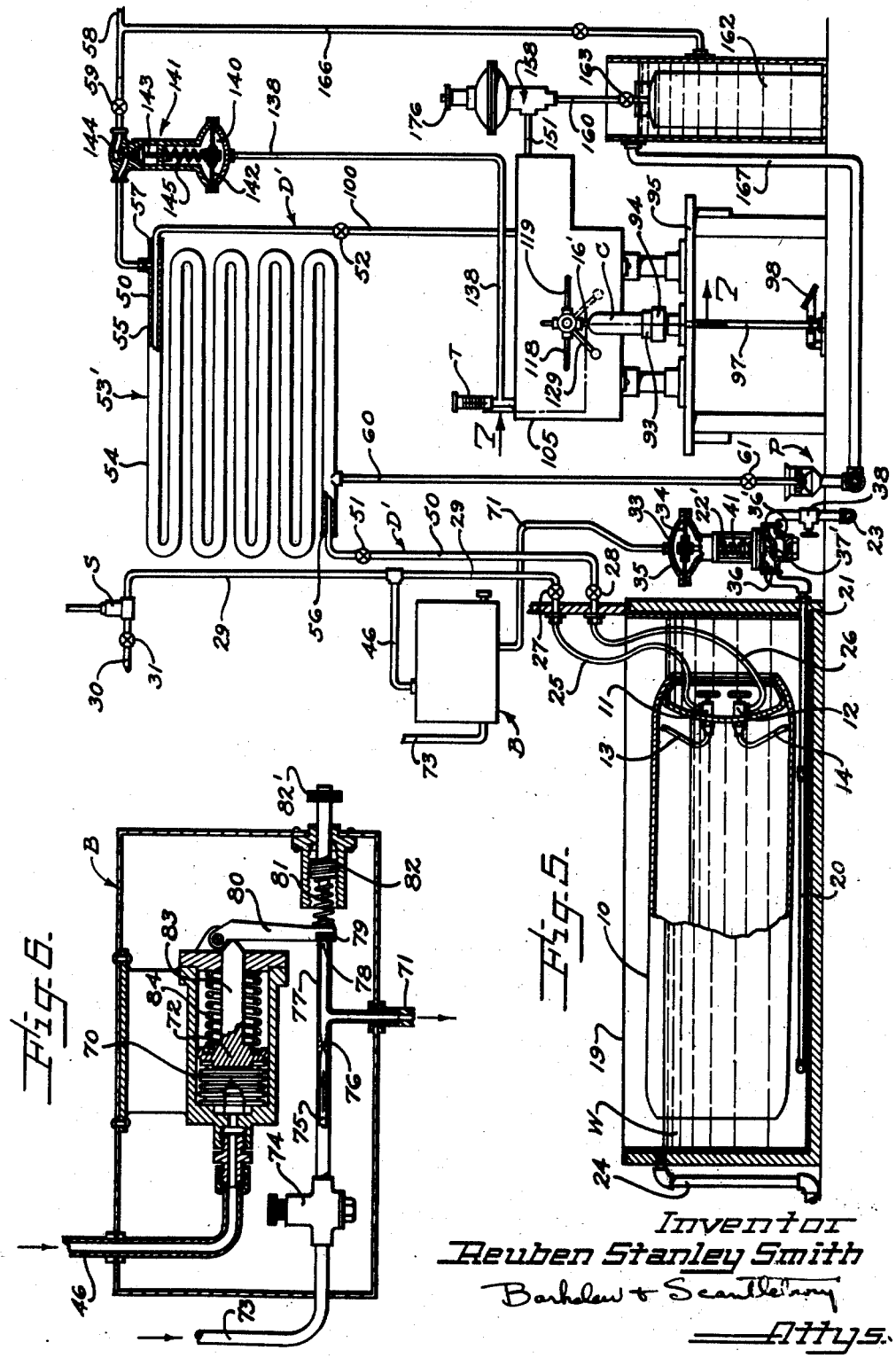

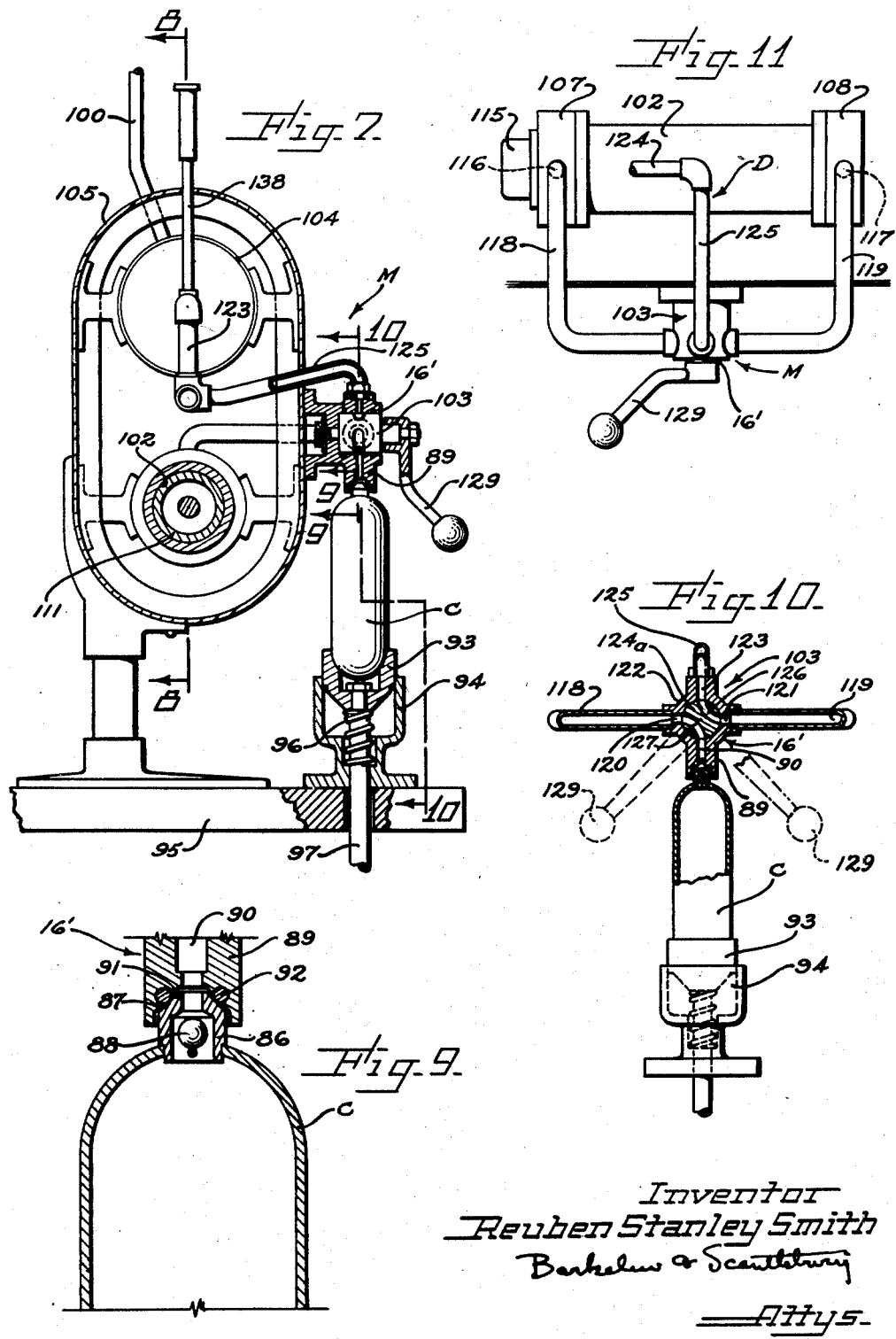

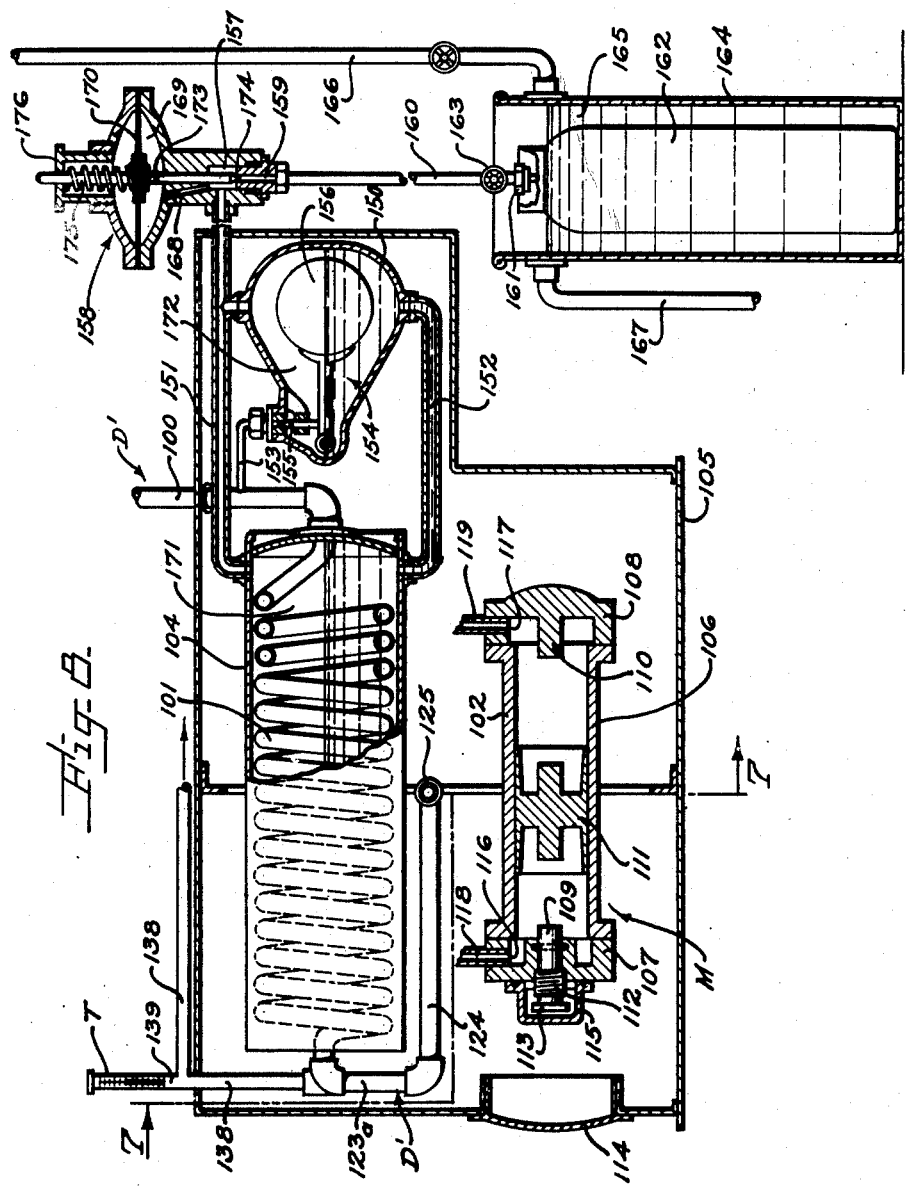

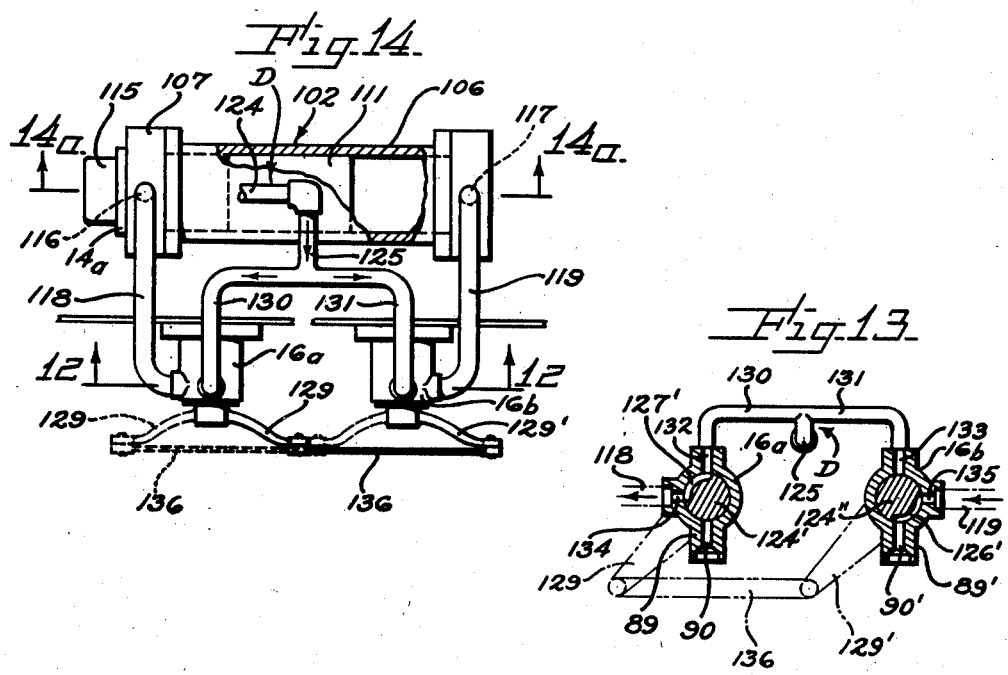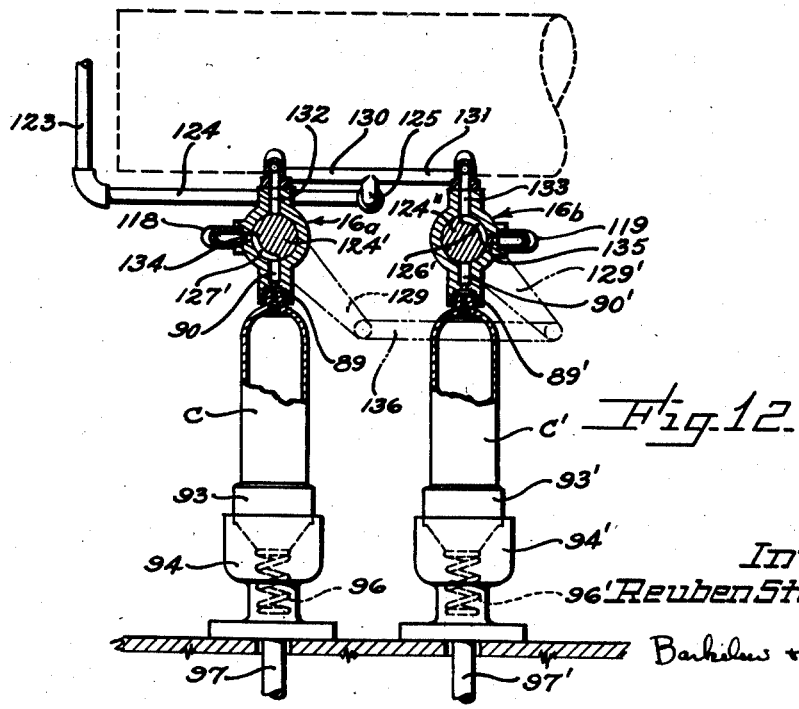

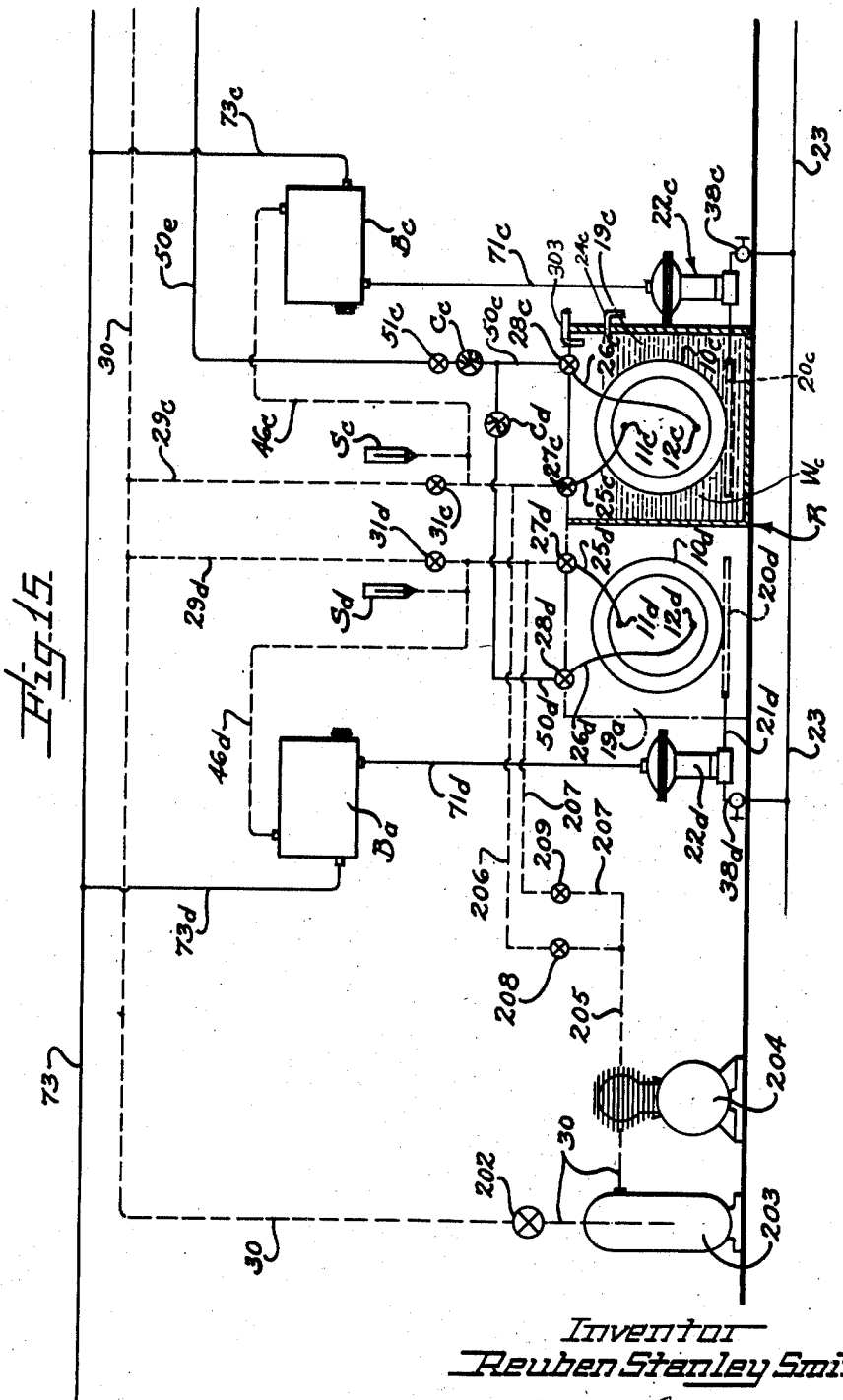

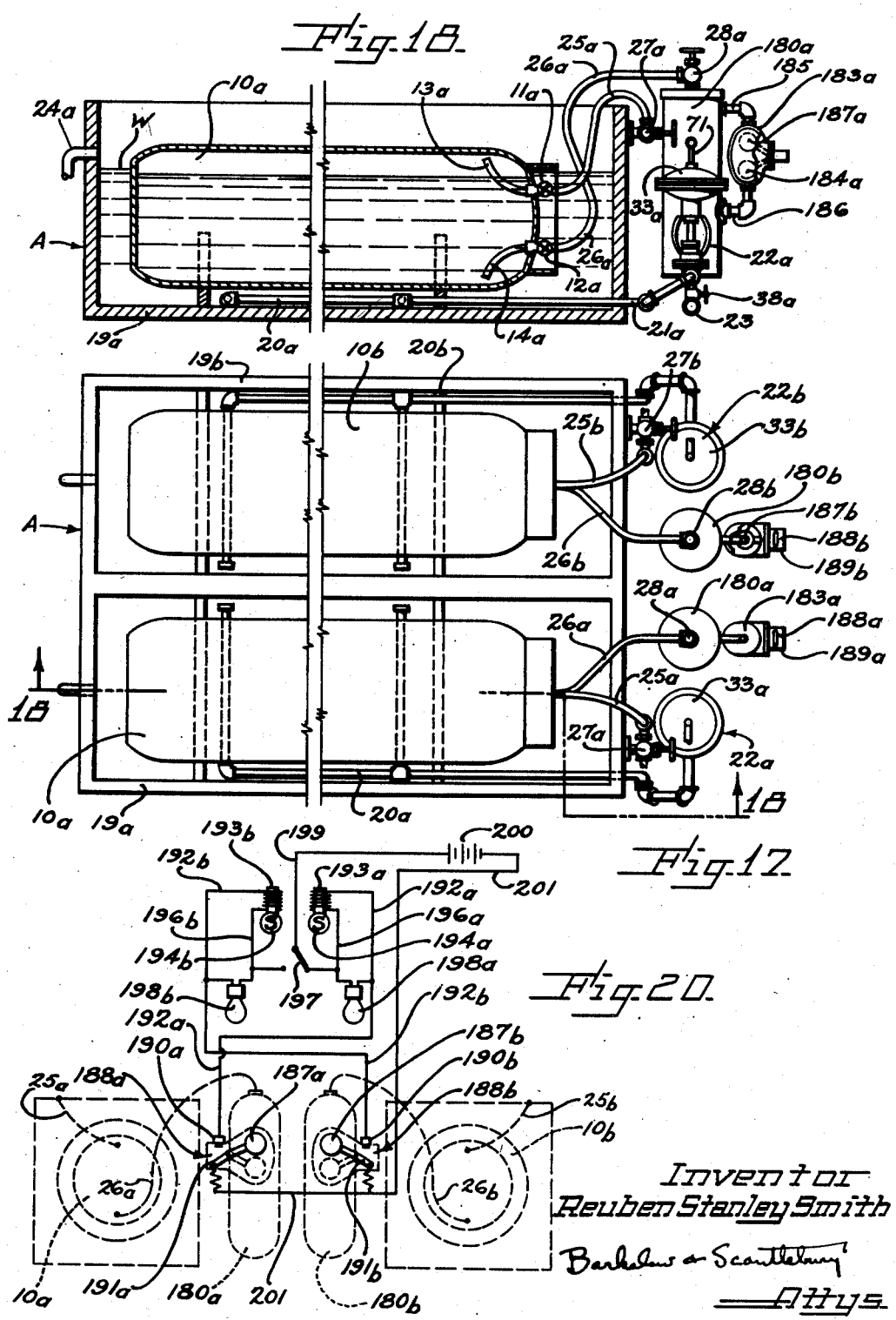

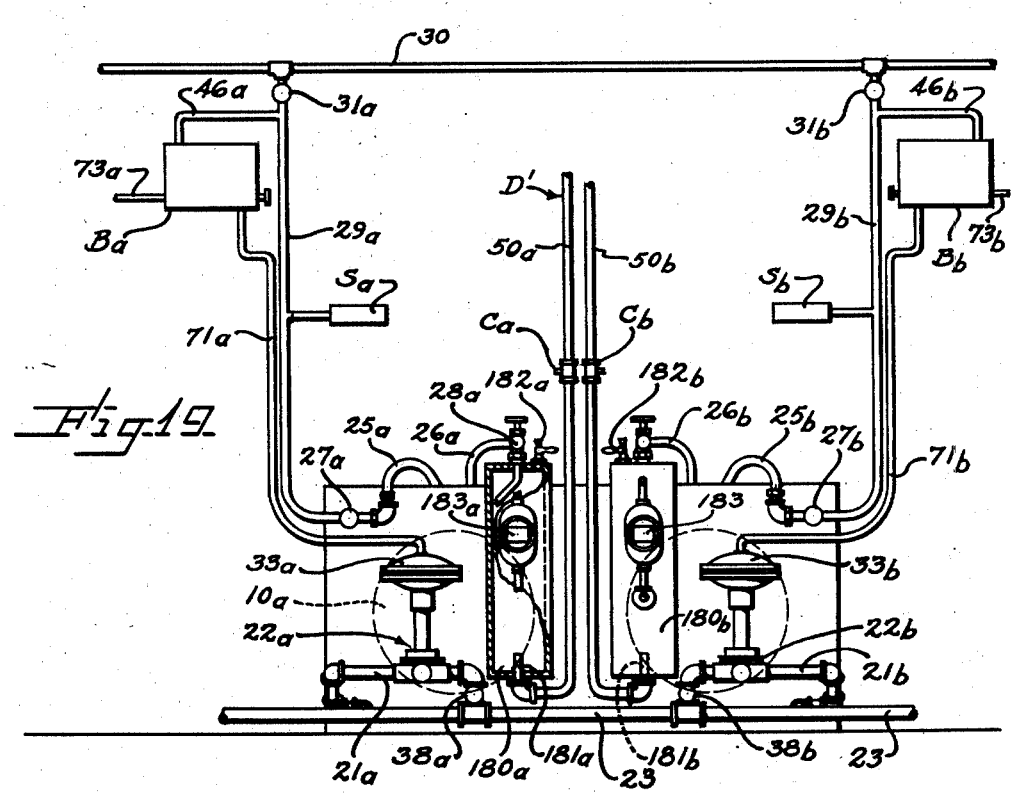
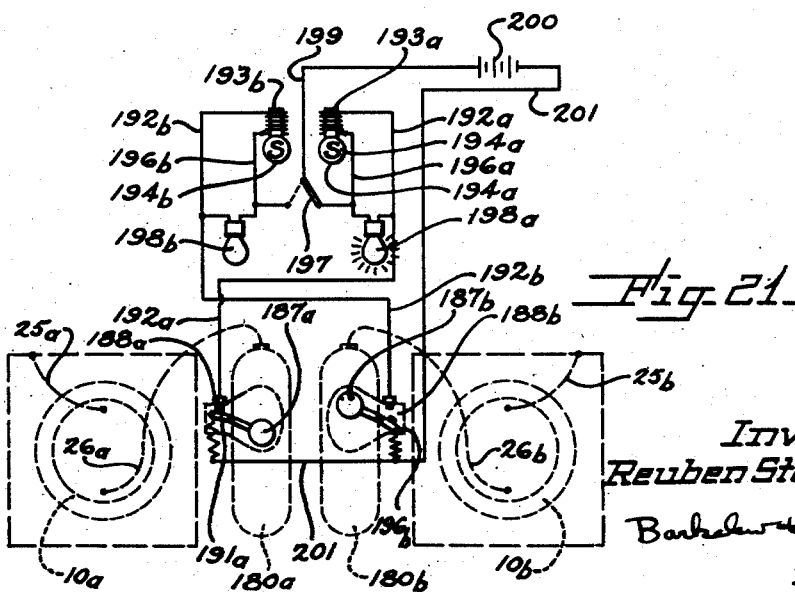

Patented Jan. 2, 1951

2,536,322

UNITED STATES PATENT OFFICE 2,536,322

TRANSFER AND RECOVERY SYSTEM FOR VOLATILE LIQUIDS

Reuben Stanley Smith, Altadena, Calif., assignor, by decree of distribution, to Jessie F. Smith Application June 23, 1945, Serial No. 601,135

19 Claims. (Cl. 62—1)

This invention has to do generally with transfer systems for volatile liquids, and is more particularly concerned with a system wherein the transfer pressure is developed and maintained by application and control of differential temperatures.

The invention may be used to advantage in connection with any liquid which, at atmospheric pressure, has a boiling temperature lower than normal atmospheric temperature. Included in this category of low boiling point liquids are liquefied petroleum gases, such as butane, propane and isobutane; and refrigerants such as ammonia, sulphur dioxide and dichlorodifluoromethane, the latter refrigerant being known to the trade as "Freon 12" or "F 12."

In order to simplify the discussion, I have elected to describe the system in connection with the transfer and recovery of dichlorodifluoromethane, and, to further simplify matters, I will refer to this substance as "F12." However, it is to be distinctly understood that this election is made solely for illustrative purposes and is not to be considered as in any way limiting the invention or the appended claims.

The invention is particularly useful in transferring "F12" from container to container, necessarily through a closed transfer system, as, for instance, in filling a series of small containers or receivers from a relatively large supply tank such as is used for shipment purposes, and I will therefor further limit my description to such an installation without, however, limiting the invention or the appended claims to such installations.

Because of the high vapor pressures that may develop in the liquid during shipment or while in storage, "F 12" is transported in heavy-walled containers which have relatively small, valved outlets which minimize the danger of leakage and reduce the hazard in case the valves fail completely. However, these small outlets contribute to the difficulty of effecting efficient and rapid transfer of the liquid from the tank, and it is among the objects of the present invention to provide a transfer system which enables efficient transfer in spite of this particular difficulty.

The above is only one of the many difficulties of transfer which have been solved by my invention. I will point out a few of these other difficulties so the significance of the present invention may be more clearly apparent.

One known method of transfer involves the use of a mechanically operated fluid pump in the transfer line. Such a pump must have an inlet pressure sufficiently reduced below the tank pressure to insure a volume of inlet flow sufficient to meet the required volume of outlet flow. But a reduction of pressure in the pump intake to any point below the vapor pressure currently existing in the tank, causes immediate vaporization within the pump intake passages, resulting in a "foaming" intake which not only interferes with proper pump operation but also represents a serious efficiency loss in that each unit volume of delivery to the pump is made up in part of bubbles of gas. The small outlets normally provided for tanks of this type (the reasons for which have been given above) greatly aggravate this condition, for the smaller the size of the outlet, the greater must be the differential between the tank pressure and the pump-intake pressure to produce a pump delivery of given volume.

Furthermore, pumps are subject to material efficiency losses by reason of slippage and of leakage of the vaporizable liquid through packings around externally driven pump shafts. Another shortcoming of the mechanical pump system comes about by the undesirable surging effect resulting from the successive opening and closing of the delivery control mechanisms incidental to filling systems such as disclosed in one embodiment of my invention.

The use of mechanical pumps necessitates the inclusion of by-pass arrangements in transfer systems. Such by-pass arrangements cause objectionable variations in pressure and flow, and cause other difficulties by reason of the generation of heat due to fluid friction. Since, in a filling system where a number of receivers are to be filled successively, it is desirable to maintain the liquid pressures at operating values during the periods of non-delivery (for instance when filled receivers are being replaced by empty ones) the pump must be kept constantly in operation. As a result the pump is exposed to maximum conditions of wear even during periods when no actual delivery is being made by the system, the aggregate wear during non-delivery periods of operation representing considerable economic loss and a decided shortening of the useful life of the pump.

Another known method of transfer has involved the introduction of pressurized gas of a "permanent" type, such as air or carbon dioxide, to the container from which transfer is to be made. This method has a number of inherent disadvantages. Irrespective of the gas being used, it is subject to heavy absorption by the liquid being transferred, resulting not only in loss of the gas but also in unavoidable contamination of the liquid, which is normally undesirable and, in some instances, prohibitive.

Furthermore, if it be attempted to make a complete discharge of the liquid, there will almost certainly be delivery of gas into the delivery line, and hence into the receiver, following up the stream of liquid.

Not only does the use of such a system involve the initial cost of the gas and the cost of compressing it, but, if it is recoverable at all, such portions as are recovered, necessarily at some cost, must be recompressed before re-use. When inflammable fluids such as butane or propane are to be transferred, the use of relatively cheap compressed air is precluded, because of the hazard of fire or explosion.

It is therefore among the major objects of my invention, to provide a transfer system which presents none of the difficulties of the systems spoken of above. The use and difficulties of both pumps and foreign transfer gases are entirely avoided. The transfer is effected by the creation and maintenance of differential pressures through the control of temperatures. The system is relatively simple and is relatively inexpensive to operate, and yet it is capable of rapid operation. It involves the maintenance of a steady pressure on the liquid to insure positive, even flow, without being subject to mechanical breakdown or wear on parts during periods of non-delivery. Operation is silent and may be started and stopped by merely opening and closing valves. It may be maintained, at slight cost, in a condition of readiness for instantaneous use after relatively long inactive periods. Supply tanks may be substantally completely discharged without loss of fluid and without contamination of that fluid in either the supply tank or receiver. By proper control of temperature differentials, and hence pressure differentials, flow may be easily maintained at any speed desired, within reason. It is possible to effect the transfer where initial pressures in the receiver have to be overcome, and where the supply tank and receiver are widely separated. Rapid transfer is possible in spite of high resistances which may be imposed by accessory equipment or small-area fittings in the transfer line or filling equipment.

Now I am aware that limited transfer has been effected by merely heating the discharging tank, or the surface of the liquid in the tank, to create a higher vapor pressure than that existing in the receiver. However, since the pressure differential has been created by heating the liquid in the discharging tank, the passage of this heated liquid to the receiver quickly establishes substantially an equilibrium of temperatures and vapor pressures in the discharging tank and receiver, thus destroying the pressure differential necessary for effective transfer, or at least reducing it to an extent such that, long before the receiver becomes filled, the rate of filling is reduced below commercial requirements. This condition precludes continuous delivery and greatly limits the extent to which the supply or discharging tank may be emptied—at least by commercially practicable procedures.

I am also aware that transfer methods have been employed where the pressure differential has been initiated by merely cooling the receiver. This has been done by boiling off some of the liquid in the receiver. If this is accomplished by venting the receiver to the atmosphere there is loss of material and, in the case of such liquids as propane, there is a definite fire and explosion hazard. If the boiling is accomplished by discharging some of the receiver liquid to a recovery tank for recompression, the cost of recovery and recompression must be added to the cost of the transfer system. Furthermore, each receiver presented for filling must have similar individual treatment.

Selective cooling of receivers has also been accomplished by exposing them to the effect of externally applied refrigerants. As is true of any refrigerating system, this involves expensive apparatus which is costly to operate and maintain. Furthermore, to maintain the requisite pressure differential in a manner to provide continuous delivery (and this is also true of the "boiling off" method spoken of above) the cooling effect must be continued throughout the delivery operation to properly dissipate the heat of the incoming liquid. And, as in the case of the "boiling-off" method, each receiver must be exposed selectively to refrigeration. The time element, alone, necessary to "ready" the individual receivers is, in the aggregate, one which greatly minimizes the practicability of the refrigerating type of system.

Therefore it is among the objects of the present invention to provide a thermally pressurized transfer system wherein all the advantages inherent to such a system, in any form, are had, and yet wherein the above disadvantages of known thermal systems are avoided. The requisite transfer temperature differential is not only quickly and readily attained, but it is positively and constantly maintained so as to insure the capability of continuous flow, even up to the point where the supply tank is almost completely emptied of the liquid. All this is accomplished without the necessity of individual temperature treatment of the receivers or liquid therein.

Broadly, the invention includes a closed system wherein a pressure differential essential to transfer is created and maintained by heating the liquid in the supply tank to develop a tank pressure sufficiently greater than the receiver pressure to promote liquid flow from the tank to the receiver, and then applying cooling means to the liquid, after it leaves the tank, to prevent subsequent equalization of the temperatures (and hence pressures) of the liquid in the tank and the liquid in the receiver. The cooling is sufficient in amount and is so applied that equalization is avoided by an amount which is ample to maintain efficient filling speed.

Since the cooling means is applied between the tank and the receiver, the necessary pressure drop occurs before the receiver is reached, and the receiver therefore does not have to be subjected to special refrigerating treatment.

It is also among the objects of the invention to provide a thermally controlled filling system whereby, with minimum operator attention and with maximum speed, it is assured that equal quantities of volatile liquids are delivered to successively filled containers. The system is such that it is particularly well adapted to situations where the amount of fluid to be delivered to each container is critical, and yet where it is essential from an economical standpoint that the filling be accomplished with relatively great speed. Such is the case in filling so-called "pesticide aerosol" containers or "bombs," where a mixed charge of dichlorodifluoromethane, pyrethrum and sesame oil is to be packaged, or where a charge of dichlorodifluoromethane is to be added to receivers which already contain a mixture of pyrethrum and sesame oil. A meter is employed for determining the charge delivered to each container and this meter is preferably adjustable as to volumetric output. As a further feature, I may provide auxiliary heat-exchange means for establishing the exact temperature at which the volatile liquid is metered, so, for given volume delivered, it will be assured that given density is represented. In this aspect of the invention, the main heat-exchange means assures sufficient pressure differential to power the system with ample margin, and then the liquid, as it enters or is actually in the meter, is exposed to the auxiliary heat-exchange means to insure that the volumetric output of the meter represents a predetermined weight displacement; the liquid, after this final heat exchange, still being sufficiently low in temperature to maintain the differential within the operative range.

The invention presents many features of refinement over and above the broad statements just made, but these may be pointed out to much better advantage in connection with the following detailed description of particular embodiments of the invention.

However, it may be said here that it is also among the objects of the invention to provide means for recovering and returning to the system such vapor as may be left in a supply tank after the liquid has been more or less completely discharged therefrom. I have also provided means whereby a plurality of supply tanks may be incorporated in the system with a change-over arrangement which permits and, in certain embodiments, automatically causes a full tank to take over, without interruption in liquid flow, the duty of supplying the system with the liquid as soon as the currently active tank has been emptied to a predetermined extent.

Many other novel features and objects of the invention will be made apparent in connection with the following detailed description, reference being made to the accompanying drawings, wherein:

Fig. 1 is a schematic view illustrating one embodiment of the invention;

Fig. 2 is a detached, top plan view of the heating trough shown in Fig. 1;

Fig. 3 is an enlarged, fragmentary detail of the cooling coil shown in Fig. 1;

Fig. 4 is an enlarged, medial section of a steam regulating valve shown in Fig. 1;

Fig. 5 is a schematic view illustrating a variational embodiment of the invention;

Fig. 6 is a detached, enlarged section taken through a control box illustrated in Fig. 5;

Fig. 7 is an enlarged section on line 7—7 of Fig. 5, and also represents a section taken on line 7—7 of Fig. 8;

Fig. 8 is a section on line 8—8 of Fig. 7;

Fig. 9 is an enlarged, fragmentary section on line 9—9 of Fig. 7;

Fig. 10 is a section on line 10—10 of Fig. 7;

Fig. 11 is a top plan view of Fig. 10;

Fig. 12 is a view similar to Fig. 10 except that a double filling head is shown;

Fig. 13 is a detached detail showing the valves of Fig. 12 in changed positions;

Fig. 14 is a top plan view of Fig. 12;

Figs. 15 and 16, taken together as mutual continuations one of the other, diagrammatically illustrate another embodiment of the invention;

Fig. 17 is a top plan view of the supply tanks and troughs shown in Fig. 16;

Fig. 18 is a section on line 18—18 of Fig. 17, with the heating coil illustrated in full lines, though it is actually between the observer and the sectional plane;

Fig. 19 is an end elevation of Fig. 18 but showing in addition the extensions of certain of the pipe leads;

Fig. 20 is a wiring diagram showing certain control circuits, with structural features of the heating and change-over system indicated in dotted lines to aid in locating certain electrical elements; and Fig. 21 is a view similar to Fig. 20 but showing the circuit in different operating condition.

As stated in the forepart of the application, the invention is advantageously applicable to the closed-system transfer of many different volatile liquids. However, for purposes of illustration I will refer only to the transfer of dichlorodifluoromethane, or "F 12." Such reference makes it possible to give specific illustrative characteristics, which enables me more clearly to explain the behavior of volatile liquids when subjected to the described transfer treatment. But it is to be borne in mind that this choice of a particular liquid for illustrative purposes is in no way to be considered as limitative on the claims appended hereto.

Likewise, while I will name specific temperatures and pressures, and specific relative or differential temperatures, it is to be understood that this is done purely for illustrative purposes and is not to be taken as imposing limitations on the claims.

In Figs. 1 to 4, I have illustrated schematically a simplified transfer system which exemplies certain of the broad principles of the invention. The numeral 10 indicates a supply tank containing volatile liquid such as "F 12." Ordinarily such a tank is made of very heavy metal and has relatively small, valved outlets 11 and 12 connected to curved dip tubes 13 and 14, respectively. With the tank arranged horizontally, the uppermost valve (here valve 11) controls the discharge of gas from the tank and the lowermost valve (here valve 12) controls the discharge of liquid.

A discharge or filling head, valve controlled at 15, as indicated at 16 and, for illustrative purposes, it is shown as being adapted at 17 for detachable, vapor tight connection to the relatively small container or receiver 18. The size of the receiver is of no moment insofar as the broad aspects of the invention are concerned. However, it is here shown as being relatively small because the successive filling of a number of small containers from a single, relatively large container presents special flow problems which are fully met by my invention.

The system includes means for heating the liquid in tank 10 and thereby raising its vapor pressure to a given value, as will be explained in detail later. While any suitable means may be employed for thus heating the liquid and my invention broadly contemplates any such means, I have illustrated preferred heating means in the form of a trough 19 containing hot water W into which the supply tank 10 is lowered. Water W, in turn, is heated by a steam "coil" 20 connected by pipes 21, 21' and valve 22 to a source of steam, such as steam line 23. Steam admitted to the coil escapes through orifices 25' (Fig. 2) to heat water W, the water acting as a heat exchanger to raise the temperature of tank 10 and its contents. Overflow line 24 disposes of excess water in the trough. The means for controlling the steam and hence regulating the temperature and pressure of the "F 12" in tank 10, will be discussed later.

The "bath" type of heating means is particularly efficient in a system of this kind. It is relatively inexpensive, both from the standpoint of installation and the standpoint of operation, and avoids many of the complications inherent in other systems. It allows even, steady application of heat and hence gives even, steady pressure effects. And water is superior as a bath-type of heating agent because of its high specific heat whereby a relatively small quantity of heated water (having a specific heat of 1.00) is capable of transferring heat to a relatively large quantity of "F 12" (having a specific heat of approximately .25) and is capable of storing up heat in sufficient amount to meet sudden demands.

Valves 11 and 12 are connected by hose lengths 25 and 26 to trough-supported valves 27 and 28, respectively. Valve 27 is connected to vapor line 29 which is provided with safety valve S, and, if desired, with a branch 30, valve-controlled at 31, making up part of a recovery system (not shown in this figure). For the purposes of this simplified description of the transfer system, it will be assumed that valve 31 is closed at all times.

I will now describe the illustrated means for controlling the temperature of the liquid in tank 10. Valve 22 (Fig. 4) may be of any suitable pressure-actuated type. It is here shown as made up of a housing 32 whose dome 33 and diaphragm 34 define a gas or pressure chamber 35, and whose lower portion defines valve chambers 36 and 36'. Valve stopper 37 is adapted to be reciprocated to open and close communication between chambers 36, 36' and hence between steam line 23 and coil 20; pipe 21 opening to chamber 36, and pipe 21', valved at 38, leading to valve chamber 36' from steam line 23.

Stem 41 extends from valve 37 through packing 42 and adjustment nut 43, the latter being threadably supported in housing 32 above the access openings 44. The stem is connected to diaphragm 34, which is loaded from beneath by spring 45, the effective force of which is adjusted by nut 43. Pressure chamber 35 is connected by pipe 46 to vapor line 29.

Nut 43 is adjusted so that when the vapor pressure, and hence the temperature, of the liquid in tank 10 is of less than predetermined value, spring 45 opens valve 37 against that pressure, as applied on diaphragm 34. Thereupon steam is admitted to coil 20 from line 23, raising the temperature of water W and therefore raising the temperature and pressure of the liquid in tank 10. When the predetermined tank pressure and temperature are reached, diaphragm 34 is depressed against the action of spring 45 and thus closes valve 37 to shut off the flow of steam to the heating coil. In this manner the temperature and vapor pressure of the "F 12" in tank 10 are maintained substantially constantly at predetermined levels.

Valve 28 connects to pipe 50, making up a part of delivery line D which leads to valve 15 and discharge or filling head 16, valves 51 and 52 being interposed in said line. Between valves 51 and 52, delivery line D has a portion or zone in the form of a coil 53 which is jacketed at 54, the continuous annular space 55 between the delivery line and the jacket being closed off at its ends 56 and 57 (see Fig. 3) and comprising a flow channel for a cooling medium, such as water under pressure, which is admitted from water supply line 58, valve-controlled at 59, and discharges through pipe 60 which may be valve-controlled at 61.

It will be observed that the direction of water flow is counter to that of the "F 12" in line D, it thus being relatively easy to efficiently cool the "F 12" in its passage toward the discharge or filling head in a manner to insure that the "F 12," as it leaves the cooling zone, is at the proper temperature to establish a predetermined differential with relation to the temperature of the liquid in tank 10. And, of course, the etsablishment of a predetermined temperature differential, establishes a predetermined pressure differential. The jacketing of a zone of line D provides an efficient means of presenting a large heat-transfer area between the liquid in the delivery line and the cooling liquid, and thereby insures rapid cooling of the "F 12."

By the adjustment of either or both valves 59 and 61, the speed of flow and therefore the cooling effect of the water in channel 55 may be controlled. Thus it is possible to control the temperature at which the "F 12" leaves the cooling zone represented by jacketed coil 53, and thus regulatably to establish any predetermined operating differential (within reasonable limits) between the pressure of liquid (heated to a predetermined degree) in tank 10 and the pressure of the cooled liquid as it leaves coil 53.

The following description of a typical operation is given purely for illustrative purposes and is not to be considered as limitative on the invention. It will be assumed that 50 pounds per square inch pressure on the "F 12" is somewhat more than sufficient to force it into the receiver with requisite speed and against the pressure built up within the receiver by compression of, for instance, the air initially filling the receiver. However, in certain installations it is desirable to "vacuumize" the receiver prior to the discharge of "F 12" thereinto—in which case the filling pressure of the "F 12" may be materially reduced.

It will also be assumed that it requires somewhat less than 30 pounds per square inch on the "F 12" to force it through outlet valve 11, to overcome friction losses in the delivery line, and to force it with requisite speed through the fittings and flow passages of that line and of the filling head.

Under the assumed conditions, it will be seen that to operate the transfer system with full effectiveness there must be created and maintained a total differential of approximately 80 pounds per square inch between the pressure of the "F 12" in the supply tank and the pressure of the "F 12" as it leaves the cooling zone, with the preponderant pressure in favor of the former.

Of course, it will be realized that the system is capable of great flexibility. By varying the cooling temperature with relation to the heating temperature, or vice versa, the differential may be varied to suit different loads. By varying the positions, in the temperature scale, of the limits of any given differential, the system is readily adaptable and adjustable to suit it best to prevailing atmospheric and cooling temperatures, it ordinarily being desirable that the liquid be delivered to the receiver at a temperature approximately equal to the prevailing atmospheric temperature and that the requisite cooling be accomplishable by available "tap-water."

Returning to the illustrative case, where it is desirable to create and maintain a differential of 80 pounds, valve 22 is set to maintain the temperature of water W at such value that the temperature of the tank-contained "F 12" is maintained at 130° F., thus maintaining the vapor pressure of the "F 12" at 180 lbs. per square inch. (All pressures mentioned in this discussion are to be considered as gage pressures unless otherwise specified). All valves, except vapor-line valve 31, are opened, though, of course, valve 15 is adapted to be closed whenever a full receiver 18 is to be replaced by an empty one or if, for any other reason, it be desired to check the outlet flow from head 16.

The temperature and flow speed of the water in jacket channel 55 is such that, with the given effective heat-transfer area in the coil 53, the "F 12", as it leaves the coil, is at approximately 90° F. and therefore has a vapor pressure of approximately 100 lbs. per square inch.

There is thus established the desired effective flow-pressure differential of 80 lbs. per sq. in., which, in the example given, is sufficient to overcome all line resistances and to compress the initial gas in the receiver 18 to an extent which will admit a predetermined amount of "F 12"—all at a speed commensurate with the requisite rapidity of filling. The receiver valve 18' and delivery valve 15 are closed before the receiver is detached from head 16, but the system remains in a condition of readiness to perform at full efficiency as soon as an empty receiver is connected to the head and valves 15 and 18' are reopened.

In actual practice, where approximately an 80 lb. differential was maintained and where there was used a filling head similar to that described and claimed in my copending application entitled Filling Head (A), filed June 23, 1945, Serial No. 601,134, now Patent No. 2,505,800, I have discharged from a one ton container of "F 12" into one pound receivers at a continuous rate of ten receivers per minute, though by no means is the system limited to this filling rate.

In Figs. 5 to 14, I have shown a system wherein the basic principles of operation are the same as those described above, but wherein certain refinements and additional features are included. In order to avoid repetititive description, elements which are similar to those previously described will be given corresponding reference numerals, and it is to be considered that the earlier description applies to such similar elements.

In Fig. 5 valve 22' is similar to valve 22 except that stopper 37' is inverted so that depression of diaphragm 34 opens the valve. Valve 22' controls the flow of steam to coil 20 in the general manner described in connection with valve 22, but the valve is actuated indirectly by the vapor pressure in tank 10. The valve is directly actuated by air pressure which, in turn, is controlled by the vapor pressure in the tank. In this manner it is possible to avoid direct contact between the "F 12" and diaphragm 34 and thus to eliminate deterioration of the latter; and it is more readily possible to secure an extremely sensitive control system, whereby it may be assured that the vapor pressure in the tank is maintained at predetermined value with minimum fluctuation.

Thus, vapor line 46, instead of leading to valve 22', leads to closed, pressure-responsive element such as "Sylphon" bellows 70, for example (see Fig. 6). Bellows 70, located in housing B and having a movable head 72, is adapted to control valve 22' by indirectly creating variations of pressure in the air line 71 which is connected to diaphragm chamber 35 of valve 22'. Element 70, in turn, is activated by variations in the vapor pressure in tank 10.

A high pressure air line 73 leads to the conventionally illustrated pressure-reducing or regulating valve 74 which is adapted to admit air to pipe 75 at a predetermined reduced pressure, which pressure is ample to depress diaphragm 34 sufficiently to open valve 22' completely under certain conditions of operation.

Pipe 75 opens through restriction 76 to line 71 and branch line 77, the open end 78 of branch 77 serving as a bleed or relief port. A valve disk 79 is mounted on a swinging arm 80 whereby the disk is movable to and from a position closing port 78, being resiliently urged towards closing position by spring 81. The effective force of the spring is adjusted by screw 82, manipulated through a knurled head 82' at the exterior of housing B.

Arm 80 engages the end of plunger 83 which is carried by the movable bellows-head 72. Movement of said head to the right under increased pressure in line 46 is resiliently resisted by spring 84 as well as by the relatively light spring 81. The springs thus represent a loading on the bellows which is a factor in its response characteristics under varying internal pressure.

It will be understood that housing B merely provides a support for the various operating elements and it is not hermetically sealed. There is sufficient capacity for leakage at points of pipe-entry to prevent the building up of sufficient pressure within the housing to interfere with the described operation.

Spring 81 is so adjusted that when the pressure in line 46 is that at which it is desired to maintain the liquid in tank 10, valve 79 will be held open by plunger 83 to an extent which will permit slight continuous leakage of air from pipe 77, which leakage will, because of restriction 76, drop the pressure in lines 77 and 71 slightly below that existing in pipe 75. The value of this decreased pressure in line 71 is just insufficient to unseat valve stopper 37'. Hence valve 22' remains closed with the result that no steam is admitted to coil 20.

Should the pressure in tank 10 drop below the predetermined value, bellows 70 will correspondingly collapse and plunger 83 will move to the left. Spring 81 thereupon becomes effective to close valve 79, it resulting that the pressure in lines 77 and 71 is built up sufficiently to depress diaphragm 34 and stopper 37', thus opening valve 22' and admitting steam to coil 20 to raise the temperature of water W and hence to raise the temperature and vapor pressure of the liquid in tank 10. As soon as the pressure in the tank rises to the predetermined value, bellows 70 expands, reopening valve 79 to restore the relatively low pressure in pipes 71 and 77, whereupon, spring 45 recloses valve 22'.

By adjusting the effective force of spring 81 through manipulation of screw 82, the operator may set the controlling mechanism to respond in a manner to operate valve 22' at any selected tank pressure, within the design range.

The delivery line D' and jacketed cooling coil 53' are similar to line D and 53, respectively, except that the "F 12" flows upwardly through coil 53' and the cooling water flows downwardly through jacket passage 55. I will later describe an additional control feature in connection with the water supplied through pipe 58. Pipe 60 leads to a conventionally illustrated drainage or waste disposal system P.

The filling head 16' is here of a type particularly well adapted to allow rapid, successive filling of a plurality of relatively small receivers such as the can C. For illustrative purposes, only, I have shown can C in the form of a metal bottle whose neck 86 (see Fig. 9) is provided with an external conical seat 87 and a check valve 88. The valve may be of any suitable type, or it may be in the form of a plug (not shown) introduced to the neck bore after the can has been filled but before it has been removed from the filling machine. Head 16', making up a part of filling machine M, includes a filling nozzle 89 having an outlet bore 90 and a conical counterbore 91 which is substantially complementary to seat 87, a ring washer 92 preferably being mounted in the counterbore.

A preferred type of filling machine is described and claimed in my aforesaid copending application, but the conventional showing of machine M will suffice for the purposes of the present application.

Can C is adapted to be applied to the filling head by a cup-shaped elevator 93 (Figs. 5 and 7) which is mounted for vertical reciprocation within cylinder 94 on table 95, and is spring-supported at 96. Rod 97 extends from the elevator to pedal 98, actuation of which depresses the elevator against the action of spring 96. With the pedal and elevator depressed, an empty can is placed on the elevator with neck 86 in alinement with nozzle 89. Pressure is then relieved from the pedal, and spring 96 acts on the elevator to raise the can and to effect a vapor-tight seal between nozzle 89 and neck-seat 87.

The delivery line D', below valve 52, is extended into connection with head 16' via pipe 100, coil 101, meter 102, pipes 123a and 125, and the valve 103 of the head (see Figs. 7, 8, 10 and 11). Coil 101 extends through a tank 104, and this tank and meter 102 are supported within housing 105 which is made of any suitable heat-insulating material. However, the function of the coil, tank and housing will not be described until later in the specification.

Meter 102 comprises a cylinder 106 having heads 107 and 108 carrying stops 109 and 110, respectively, for limiting the stroke of floating piston 111. Preferably, stop 109 is adjustable, being in the form of a packed-off pin having threaded connection 112 with head 107 and being provided with an external wrench-taking head 113 which is rendered accessible for manipulation by removing housing-cap 114 and head-cap 115. By adjusting stop 109, the stroke of piston 111 may be regulated for volumetric change or accuracy. Opening through heads 107 and 108 are ports 116 and 117, respectively. These ports are connected by pipes 118 and 119, respectively, to diametrically opposite ports 120 and 121 in the body 122 of valve 103.

Pipe 125 of delivery line D' opens to port 123 in valve body 122 (Fig. 10) and is diametrically opposite the nozzle-bore 90. Valve plug 124a, oscillatable by handle 129, has diametrically opposite, arcuate ports 126 and 127. When handle 129 is in the full line position of Fig. 11 (corresponding to the dotted line position in Fig. 10) plug port 126 puts ports 123 and 121 into communication and plug port 127 puts port 120 and bore 90 into communication. It follows that liquid from the delivery line, pressurized as described above, enters the meter cylinder 106 via pipe 119 and port 117, powering piston 111 and thrusting it to the left. Such displacement of the piston forces the measured charge of liquid at the left of the piston (which charge was admitted to the cylinder during previous movement of the piston to the right) through port 116 and pipe 118 to and through valve ports 120 and 127 and, through nozzle bore 90 and bottle neck 86, into can C. As soon as piston 111 comes to rest by striking stop 109, indicating the measured charge has been fully delivered to can C, lever 129 is swung to a position mid-way of the dotted and dot-dash line positions of Fig. 10, plug 124a thus blanking ports 90 and 123 and checking further flow from the meter to nozzle 89.

Can C is then replaced by an empty can and lever 129 is swung to the dot-dash line position of Fig. 10, port 126 then putting ports 120 and 123 into communication. This lever-actuation also puts bore 90 and port 121 into communication. Liquid from supply line pipe 125 then flows through pipe 118 and port 116 to force piston 111 to the right until it strikes stop 110, liquid at the right of the piston thus being forced through port 117, pipe 119, ports 121, 127 and nozzle bore 90 into the empty container. The liquid thus forced into the can is, of course, that which powered the piston during its immediately preceding stroke to the left, and, as delivered to the can, amounts to a metered charge corresponding to the effective volumetric displacement of the piston in its movement to the right. Since the piston, in its movement from left to right and from right to left, displaces equal volumes of liquid, the measured charges delivered to successively presented cans, are, of course, of equal volumetric values. Cans C are each of a size to accommodate such individually measured volumes, and, if they are not vacuumized prior to the delivery of the liquid, cans will be chosen which have sufficiently greater capacity than the measured amount of liquid as to insure that air or gas compressed within the can by the flow of liquid is ineffective to prevent full liquid delivery.

In Figs. 12, 13 and 14, is illustrated an arrangement whereby a single meter alternately supplies measured quantities to two filling heads, resulting in time-economy since, while one head is delivering its charge of liquid to a given can, the can just previously filled by the other head may be replaced by an empty one. Said other head is put in a condition of readiness so it may start to fulfill its delivery function immediately after the completion of delivery by the first head. The control valves for the two heads are preferably, though not necessarily, connected for simultaneous movement, thus automatically operating in timed relation, as will later appear.

In Figs. 12 to 14, the pipe 125 of delivery line D is branched at 130 and 131, the branches leading to ports 132 and 133 of filling heads 16a and 16b, respectively. Pipe 118 leads from port 116 of meter 102 to port 134 of head 16a, and pipe 119 leads from meter port 117 to port 135 of head 16b. The respective nozzles 89 and 89' of heads 16a and 16b are provided with delivery bores 90 and 90', and cans C and C' are adapted to be releasably applied to the heads in the manner described in connection with Fig. 7.

Valve plug 124' of head 16a and plug 124" of head 16b, are provided with arcuate ports 127' and 126', respectively, and the plugs are adapted for simultaneous oscillation by a link 136 connecting their operating levers 129 and 129'.

With the valves in the condition of Fig. 12, liquid from pipe 125 flows through branch 131, ports 133, 126', 135, pipe 119 and port 117, into the meter cylinder 106 at the right of piston 111, driving the latter to the left. By the time piston 111 reaches the limit of its left-wise stroke, it will have delivered a measured charge to can C through the following course: port 116, pipe 118, ports 134, 127' and nozzle bore 90. Since the nozzle bore 90' of head 16b is blanked by plug 124" at this time, a can previously filled by the head may be replaced by an empty can C' while can C is being filled.

When can C is full to the extent of the measured quantity delivered by the meter, link 136 is shifted to the dotted line position of Fig. 14, thus swinging levers 129 through 90° and moving plugs 124' and 124" to the positions of Fig. 13. The flow through nozzle 90 is thus cut off, so filled can C may be replaced by an empty one, and flow from pipe 125 is diverted through branch 130, ports 132, 127', 134, pipe 118 and port 116, to meter 102, thus driving piston 111 to the right. By the time the piston has reached the limit of its right-wise movement, it will have delivered a measured charge to can C' through the following course: port 117, pipe 119, ports 135, 126' and nozzle bore 90'.

By swinging levers 129 through only 45° from their positions of Fig. 12, ports 132, 133 and nozzle bores 90, 90' are all blanked and all flow is stopped.

Whether a single or double headed filling machine is used, there will be periods when the volatile liquid will not be flowing through the line. These periods of non-flow may be relatively short, as between fillings of successive cans, or they may be relatively long, as when the machine is shut down awaiting a supply of empty cans.

In any event, if, during these periods of non-flow of the volatile liquid, the flow of the cooling water were continuous, the static volatile liquid within the cooling zone is liable to be chilled to a temperature below the point at which it should be metered to give predetermined measurement by weight. With the non-flow periods of varying duration or frequency, there would be uncontrollable variation in the weight-measure delivered by the meter—even though the volumetric measure were uniform.

Therefore, I provide means whereby the flow of cooling water is confined to periods during which there is flow of the volatile liquid. Later, I will describe means whereby the liquid may be delivered at the meter at precisely the proper temperature, compensating for any temperature variations which may exist in spite of the control of the water flow.

Extending from pipe 123a of delivery line D' is a pipe 138 (Fig. 8) which may include a thermometer well 139, the thermometer T being visible externally of housing 105 and serving a purpose later to be described. Pipe 138 leads to the diaphragm chamber 140 of valve 141 (Fig. 5) which is provided in water supply line 58. The diaphragm 142 is connected by stem 143 to valve stopper 144, the latter being adapted to control the flow of water from line 58 to the jacket-passageway 55 of coil 53'. Spring 145 constantly tends to unseat stopper 144 and thus to permit flow of water through the cooling coil. However, when there is no flow of volatile liquid from the filling head, there is sufficient pressure built up in line D' (and hence line 138) to act on diaphragm 142 with sufficient force to prevent spring 145 from unseating stopper 144. When the filling head valve is opened, there is a sufficient drop in pressure of the liquid applied against diaphragm 142 to allow spring 145 to unseat the stopper and thus to permit flow of water through the cooling coil. Upon closing the filling head valve, predominant pressure is again built up in chamber 140, and valve 141 is reclosed to check the flow of cooling water.

I have described means whereby meter 102 is adjusted for varying its volumetric output. Preferably, though not necessarily, I also provide finely adjustable means whereby the liquid is admitted to the meter at a temperature which assures that the volumetric output of the meter represents a predetermined weight displacement. For this purpose, auxiliary heat-exchange means is applied locally to the liquid as it reaches the meter. In the illustrated, though not limitative, embodiment of this aspect of the invention, the main cooling means, represented by jacketed coil 53', is adjusted to be of such effect as to deliver the liquid to coil 101 at a temperature somewhat higher than that at which it must be metered if the density of the metered charge is to be of some specific, predetermined value. I then apply sensitive and finely adjustable heat-exchange means for cooling the liquid to exactly the temperature necessary for the predetermined density condition.

Within housing 105 (Fig. 8) is a float-tank 150, pipe 151 connecting the tops of tanks 104 and 150, and pipe 152 connecting the bottoms of said tanks. Pipe 153 extends from pipe 100 of delivery or flow line D' to float chamber 154, the flow of volatile liquid from pipe 100 to the float chamber being controlled by valve 155 which is actuated by float 156. The valve is set to maintain the liquid within tank 104 at a depth to cover approximately the lower half of coil 101.

Pipe 151 opens to valve chamber 157 of regulating valve 158, passageway 159 leading from the chamber to pipe 160 which is adapted for detachable connection, at 161, to condenser tank 162. Valve 163 is provided in pipe 160 just above connection 161. Tank 162 is lowered into open-ended cylinder 164. Cooling water 165, supplied by branch 166 from line 58 and discharged through overflow 167, is circulated through the cylinder around the tank.

A duct 168 in valve 158 leads from chamber 157 to diaphragm chamber 169, it following that the underside of diaphragm 170 is subjected to the vapor pressure existing in the vapor spaces 171 and 172 of tanks 104 and 150, respectively.

Valve stem 173, having stopper-portion 174, is carried by diaphragm 170 and is movable by the diaphragm to and from a position closing passageway 159 from chamber 157. The diaphragm is loaded by spring 175, the effective force of which is adjusted by manipulation of nuts 176. The nut is adjusted so spring 175 will yield under the vapor pressure imposed on the diaphragm when the value of that pressure exceeds the amount which represents the exact temperature at which the volatile liquid is to enter the meter 102 in order to have predetermined density and weight characteristics.

Assume, for instance, that the "F 12" reaches coil 101 at a temperature somewhat higher than that desired for metering. The "F 12" within the immersed portion of the coil will raise the temperature of the "F 12" bath in tank 104 to that same temperature, and the vapor pressure in spaces 171 and 172 will rise accordingly and will lift diaphragm 170 against the action of spring 175 and thus open passageway 159 to allow the vapors from said spaces to escape into the cooled tank 162. The escaped vapors result in ebullition of the liquid in tank 104, causing rapid heat absorption and consequent cooling of the warmer liquid in the coil. The liquid is delivered to meter 111 at this lower temperature.

As the temperature of the "F 12" reaches the predetermined lower value, the vapor pressure in space 159 will be sufficiently low that spring 175 re-closes passageway 174 and thus checks further ebullition within tank 104, which checks further cooling effect on the "F 12" in the coil. Since pipes 123a, 124, 125 and meter 111 are all within the insulated housing 105, and since the interior of the housing is cooled by tank 104, the liquid delivered to head 16' will be substantially at the temperature at which it leaves coil 101. Whatever heat the liquid may pick up in its travel through external head 16' may be compensated by adjusting nut 176 so the temperature of the liquid in coil 101 will be lowered a corresponding amount.

The vapor delivered through pipe 160 will return to liquid state in condenser 162, which may be periodically replaced by an "empty," the condensate in the full condenser being subsequently salvaged. The losses from tank 104 due to the vapor flow into the condenser are constantly replaced from pipe 100 of the flow line—through pipe 153, valve 155, float tank 150 and pipe 152.

With liquid always entering coil 101 at a given relatively high temperature, the auxiliary cooling system will cut in and out to maintain a condition of substantial equilibrium so the liquid always reaches the filling head at substantially the predetermined temperature and density. On the other hand, if the liquid enters coil 101 at different temperatures, though always at a point above the predetermined metering temperature, the auxiliary cooling means still functions to insure an even delivery at the predetermined metering temperature.

Thermometer T keeps the operator advised of the temperature of the liquid as it leaves coil 101, and if it indicates that the temperature is not of the desired, predetermined value, regulating valve 158 is adjusted until the desired temperature is indicated.

In a filling system of the general type described, it is, of course, highly desirable from many standpoints that there be no interruption in the filling operation when a supply tank becomes exhausted. These tanks are bulky and it necessarily requires considerable time and effort to manipulate them into and out of their heating baths. Further, it requires considerable time to bring a new tank up to operating temperature.

I have therefore provided means whereby, while a given tank is still actively supplying liquid to the system, a second supply tank is connected into the system (though not yet actually delivering liquid thereto) and is thermally prepared so its liquid is at operating temperature and pressure. Then, when the first tank approaches a condition of emptiness, the second tank is put actively into the system, and the first tank is conditioned for removal from the system. The filling may therefore proceed without interruption, to very obvious advantage.

An embodiment of my invention wherein such a "changeover" is effected, is illustrated in Figs. 15 to 21. As a further feature, these figures show the inclusion of "recovery" means whereby the major portion of the vapor remaining in a supply tank after the liquid has been discharged therefrom, may be condensed and re-introduced, as a liquid, to the filling system. That this represents a very real economic saving will be realized when it is remembered that a commercial, one-ton tank holds about 125 lbs. of "F 12" vapor at 130° F., and this represents, at current prices, over thirty-five dollars worth of liquid.

In Figs. 15 and 16 (which are to be considered as mutual continuations one of the other) there are represented a delivery or dispensing unit A and a recovery unit R connected into a single system. As will later appear, the tanks of the recovery unit may periodically be selectively utilized as dispensing tanks.

The two units, so far as their tank and heating arrangements are concerned, may be identical and therefore only one (unit A) will be described in detail. However, corresponding parts of the two units will be given similar reference numerals but with individual letter-exponents. The prior descriptions applied to given elements earlier in the specification are to be considered as applying also to corresponding elements of Figs. 15 to 19.

Each unit comprises a pair of tanks, each tank being in an individual water bath which is individually heat-controlled. Thus, supply tanks 10a and 10b, in their individual troughs 19a and 19b, are included in unit A (Fig. 16) while tanks 10c and 10d, in their individual troughs 19c and 19d, are included in unit R (Fig. 15).

Figs. 17, 18 and 19 show details of unit A, but may be considered also as representing unit R except for such differences as may be noted later. In turn, with the exception of the "change-over" means (present in unit A but not in unit R) each tank 10a, 10b, 10c and 10d, and the individual heating means and heat-control means for the tanks, are the same as previously described in connection with the earlier figures, it being noted, however, that all steam-regulating valves and their controls are of the type described in connection with valve 22' rather than valve 22.

The "change-over" means for unit A includes a pair of identical float tanks 180a and 180b, associated with tanks 10a and 10b, respectively. In each case, the associated outlet hose (26a or 26b) from the supply tank (10a or 10b) connects, through its discharge valve (28a or 28b) with the top of associated float tank (180a or 180b). The bottom outlets 181a and 181b of float tanks 180a and 180b, respectively, connect with pipes 50a and 50b, respectively, of delivery or flow line D'. The volatile liquid, in its passage from a supply tank to the flow line, normally fills the associated float tank, the air preferably having been bled from the latter through pet cocks 182a or 182b. These pet cocks are also used to bleed off air which may be admitted to the system when fresh supply tanks are being coupled into the system. The temperature of the liquid in the float tanks will preferably be approximately the same as that of the liquid in the supply tanks.

External float-housings 183a and 183b define float chambers 184a and 184b, respectively, which communicate, via pipes 185 and 186, with the associated tank 180a or 180b. Within chambers 184a and 184b are floats 187a and 187b, respectively, which are adapted to operate the switches 188a and 188b enclosed in switch boxes 189a and 189b, respectively.

Switches 188a and 188b are conventionally illustrated in the Fig. 20 and 21 diagrams. Switch 188a comprises a fixed contact 190a and a contact 191a actuated by float 187a. Switch 188b comprises a fixed contact 190b and a contact 191b actuated by float 187b. Wire 192a leads from contact 190a to the winding 193a of solenoid-operated valve 194a (Fig. 16) which is in by-pass 195a. Valve 194a is spring or gravity-closed so long as its winding 193a is deenergized. The by-pass, when open, is adapted to put pipes 50b and 50 into communication, pipe 50 leading to flow-line manifold 50e.

Wire 196a leads from winding 193a to switch 197, a signal light 198a being in parallel with winding 193a. Switch 197 is in circuit through wire 199 with electrical-energy source 200. Contact 191a is in circuit with source 200 through wire 201.

Wire 192b leads from contact 190b to the winding 193b of solenoid-operated valve 194b (Fig. 16) which is in by-pass 195b and is spring or gravity-closed so long as winding 193b is de-energized. The by-pass, when open, is adapted to put pipes 50a and 50 into communication. Wire 196b leads from winding 193b to switch 197, a signal light 198b being in parallel with winding 193b. Contact 191b is in circuit with source 200 through wire 201.

When switches 188a, 188b and 197 are in the condition of Fig. 20 the circuit to solenoid valve 194b is open both at switch 197 and switch 188b; while the circuit to solenoid valve 194a is broken only at switch 188a, so it is in a state of readiness to energize winding 193a and signal light 198a the instant switch 188a is closed by the dropping of float 187a. Since, in Fig. 20, both solenoid windings are de-energized, both valves 194a and 194b are closed.

Check valves Ca, Cb and Cc are provided in lines 50a, 50b and 50c, respectively, to prevent return flow towards their respective supply tanks 10a, 10b and 10c.

Vapor line 30, valve controlled at 202, leads through fluid trap 203 to compressor 204, whose output pipe 205 is branched at 206 and 207. Branch 206, valve controlled at 208, leads to vapor line 29c, while branch 207, valve-controlled at 209, leads to vapor line 29d.

The troughs 19c and 19d of the recovery unit (Fig. 15) are provided with heating means adapted, at certain times, to be put selectively into operation for maintaining predetermined vapor pressure within recovery tanks 10c and 10d in the manner described previously in connection with a single supply tank. On the other hand, float tanks such as 180a are not included in the recovery tank unit. Instead, liquid outlet hoses 26c and 26d connect, through valves 28c and 28d, directly with flow lines 50c and 50d, respectively.

In Fig. 15 liquid flow courses are represented by solid lines, and vapor-flow courses are represented by dotted lines. The valves 27a, 27b, 27c and 27d are kept open during all normal periods of operation so it is assured that the safety valves are always in communication with the vapor spaces in the supply and recovery tanks. Therefore, throughout the following description of operation, it will be assumed that said valves (27a, etc.) are always open and they will further go unmentioned.

Likewise, it will be assumed that the cooling means, conventionally represented at 300 and applied to a portion 301 of line D' that extends from manifold 50e toward receiver C, is similar to the cooling means previously described as associated with coil 53 or 53', and it will be further assumed that this cooling means is continuously in operation, except for the modification of cooling water flow by virtue of alternate opening and closing of the valves of filling heads 16a and 16b, as previously described. It will be understood that the diagrammatic showing at M is to be taken as representing any one of the filling heads or machines previously referred to, whether or not the auxiliary cooling means, at the filling head, is included.

Referring particularly to Figs. 15 and 16, it will first be assumed that steam valves 38a and 38b are open and that tanks 10a and 10b are both full of volatile liquid which has been brought up to and is being maintained at the temperature and pressure necessary to maintain a predetermined rate of flow into receivers C and C'. It will also be assumed that recovery tank 10d is full of recovered liquid which is, preferably, at a somewhat higher temperature and pressure than is the liquid in the supply tanks, for reasons which will be given later. Steam valve 38d is open and the heat-control means (valve 22d and the mechanism in housing Bd—corresponding to the mechanism in Fig. 6) is adjusted to maintain this condition. However, valve 28d is closed so there is no flow of liquid from tank 10d into the flow line; and valve 31d is closed so the vapor line from tank 10d is open only to safety valve Sd and line 96d.

On the other hand, it will be assumed that recovery tank 10c is empty or contains less than a full charge of "F 12" from previous recovery operations. In any event, it should normally contain no air or other substances foreign to "F 12". Since it is into tank 10c that recovery is next to be made, steam valve 38c will be closed, and the water bath Wc in trough 19c will be maintained at tap temperature to cool the tank accordingly.

Valves 11a, 11b, 11c, 11d, 12a, 12b, 12c, 12d, 28a, 28b, 51a, and 52 are all open. Valves 28c, 28d, 31a, 31b, 31c, 31d, 51b, 51c, 202, 208 and 209 are all closed. It will also be assumed that float tanks 180a and 180b are both full of volatile liquid, and that switch 197 is in the condition of Fig. 20. Since it follows that floats 187a and 187b are both in their uppermost positions, switches 188a and 188b are open, the solenoids 193a and 193b are de-energized and valves 194a and 194b are spring or gravity-closed.

With the valves in such condition, the liquid in tank 10b is in readiness to flow through flow line D', but it is checked against such flow at the closed valve 51b. On the other hand, since valve 51a is open and the proper heat and pressure differentials exist between the supply tank and the filling-head ends of flow line D' to maintain transfer flow, liquid from tank 10a flows through hose 26a, tank 180a, line 50a, valve 51a line 50, manifold 50e, coil 53' and valve 52 to filling machine M, whence it is dispensable to containers C or C' as previously described.

Tank 10a thus actively supplies liquid to the filling machine, but as the liquid level within the tank drops below the inlet level of dip-tube 14a (Fig. 18) vapor will start to flow into float tank 180a and, if the temperature of the liquid in the float tank is lower than that of the liquid in the supply tank, the vapor thus carried over will continue to condense until the temperature of the liquid in the float tank reaches that of the liquid in the supply tank. To minimize this initial temperature differential, the float tank is preferably placed close to the supply tank and may be insulated against heat losses. If the float tank be spaced appreciably from the supply tank, the float tank may be heated by auxiliary heating means to maintain it approximately or exactly equal to the temperature of the supply tank, or other means may be employed to compensate for the initial differential temperatures.

When the temperatures of the liquid in the supply and float tanks are equalized, the vapor pressure still being generated in tank 10a by the heating of the liquid below the dip tube 14a, will act through hose 26a to depress the liquid level in tank 180a and float chamber 184a, thus allowing the float 187a finally to drop to the position of Fig. 21. This float-movement closes switch 188a, thus closing the circuit to solenoid 193a and signal 198a and thereby opening valve 194a and energizing said signal lamp.

The actuation of valve 194a opens supply tank 10b to manifold 50e through hose 26b, tank 188b, line 50b, valve 194a, by-pass 195a, and line 50. The operator will note the lighting of signal 198a and will therefore be aware of the change-over from tank 10a to tank 10b, but he need take no instant step since check valve Ca prevents the flow of liquid through by-pass 195a and valve 51a into tank 180a.

However, within a reasonable time the operator manually closes valve 51a and opens valve 51b. He then moves switch 197 to the dotted line position of Fig. 21, opening the circuit to solenoid 193a and signal 198a. Consequently, valve 194a closes and signal 198a is de-energized, but the flow from line 50b continues uninterrupted through valve 51b into line 50 and manifold 50e.

The change of switch 197 to the dotted line position of Fig. 21, puts the circuit to solenoid 193b and signal 198b in condition to be energized when float 187b subsequently closes switch 188b by reason of the emptying of tank 10b. Such subsequent energization opens valve 194b to cause flow, from a full tank replacing tank 10a, through by-pass 195b to line 50 and manifold 50e until valve 51a is re-opened. However, for the time being it will be assumed that valve 194b remains closed.

The operator can tell, from the energized signal lamp, which tank is being newly put into the delivery condition and, after the energized lamp is extinguished by throwing switch 197, he can tell from the position of the switch arm as to which tank is currently supplying liquid to the delivery line. Pressure gages Ga and Gb will also advise him as to the current individual and relative pressure conditions within tanks 10a and 10b.

After tank 10b has been put into active delivery condition, tank 10a can, of course, be replaced by a full tank. However, it is of decided advantage to empty the tank of recoverable vapors without losing the benfit of the heated condition of the tank and the piping connections which are already available and in condition for recovery use. Accordingly, it is preferable to recover the vapor left in tank 10a before the latter is replaced by a full tank.

One of the beginning assumptions was that recovery tank 10c is empty and is at tap water temperature, in which condition it may be kept by allowing a hose 303 (Fig. 15) continuous'y to deliver tap water to tank 19c and allowing overflow through a pipe 24c corresponding to pipe 24a or 24b in unit A.

Valve 28a is now closed, and valves 31a and 31c are opened to permit flow of vapor from heated tank 10a through hose 25a, line 30, line 29c, and hose 25c into cool tank 10c. The vapor, in contacting the cool walls of tank 10c, will condense and will thus create a tank pressure corresponding to the saturated vapor at recovery-tank temperature. For instance, if the tank 10c be at 70° F., the vapor pressure of the "F 12" therein will be approximately 70 lbs. gage pressure. Since the initial vapor pressure in tank 10a is 180 lbs. gage pressure, there is available a differential of 110 lbs. pressure to force rapid initial transfer of vapor from tank 10a to tank 10c. By the time the pressures within tanks 10a and 10c are approximately equalized, about half the vapor initially in tank 10a will have been transferred to and condensed in tank 10c.

Thereupon, or sooner if it be desired to speed up the recovery operation, valve 31c is closed, valves 202 and 208 are opened, and compressor 204 is put into operation. The compressor draws the remaining vapor from tank 10a through lines 29a and 30, down to approximately 9 lbs. absolute pressure (at which pressure only three or four pounds of vapor remain in tank 10a) and forces the withdrawn vapor into tank 10c through line 205, valve 208, line 206, line 29c below valve 31c, and hose 25c. Valves 202 and 208 are then reclosed and compressor 204 is stopped.

Valve 31a is then closed, hoses 25a and 26a are uncoupled from tank 10a, and the latter is replaced by a full tank. Hoses 25a and 26a are connected to the new tank, its valves, corresponding to 11a and 12a are opened, and valve 28a is re-opened. As the new tank is heated up to the predetermined extent, liquid will flow through hose 26a and valve 28a into float tank 180a. Any air which may be carried into the tank because of the disconnection and re-connection of the hoses is bled off at 182a (Fig. 19). As tank 180a fills, float 187a rises, opening switch 188a and thus returning the control circuits to the condition of Fig. 20, except that manual switch 197 will remain in the dotted line position of Fig. 21.

Well before tank 10b is "empty" of liquid, the full tank replacing tank 10a will have come up to the predetermined 130° F. temperature and 180 lbs. pressure. When float 187b drops by reason of the emptying of tank 10b, switch 188b closes, energizing signal 198b and solenoid 193b, thus opening valve 194b to allow flow from the full tank through by-pass 195b and pipe 50 into manifold 50e.

The operator then opens valve 51a, so the flow from the full tank may continue after valve 194b is subsequently closed. He also closes valve 51b, restores switch 197 to the position of Fig. 20, and closes valve 28b. Solenoid 193b was de-energized by the throwing of switch 197, it following that valve 194b is now closed, but flow to the manifold continues through valve 51a.

Valves 31b and 31c are now opened to permit vapor flow through lines 29b, 29c and hose 25c to recovery tank 10c under the existing differential pressures. When these pressures are approximately equalized, valve 31c is re-closed, compressor 204 is started and valves 202 and 208 are opened. The compressor withdraws the bulk of the remaining vapor from tank 10b and forces it into tank 10c by way of lines 205, 206, that part of line 29c which is below valve 31c, and hose 25c. The compressor is then stopped and valves 31b, 202 and 208 are re-closed.

Thereafter, a full tank is substituted for tank 10b and coupled into the system as described in connection with the replacement of tank 10a. As soon as valve 28b is reopened, the entire system is restored to the condition originally described, except that, since tank 180b is partially emptied of liquid, float 187b is down and switch 188b is closed. Complete restoration occurs quickly thereafter by reason of the filling of float tank 180b, which raises float 187b and closes switch 188b.

It was also a beginning assumption that recovery tank 10d is full of recovered liquid and that its pressure is being maintained at somewhat more than 180 lbs. When it is desired to admit this recovered liquid to the flow or delivery line D', valves 28d and 51c are opened, whereupon the liquid is forced from the tank through line 50d into manifold 50e, in the same manner as that described in connection with the forced delivery from the supply tanks. Preferably, the relatively increased pressure of the tank-10d liquid over that of the liquid in tanks 10a or 10b, is not only sufficient to overcome the increased resistance by reason of the longer delivery line, but, is sufficient to hold back delivery from either tank 10a or 10b through pipe 50; check valves Ca and Cb preventing the preponderant tank-10d pressure from backing the liquid into float tanks 180a or 180b.

As soon as tank 10d has delivered the major portion of its recovered vapor (as may be ascertained by noting the relative buoyancy of the emptying tank) valves 51c and 28d are reclosed, and the active supply tank 10a or 10b automatically takes up the delivery load, there thus being no interruption of flow through manifold 50e.

Steam valve 38d is then closed and the water in trough 19d is allowed to cool or is replaced by cool water, it resulting that the temperature of tank 10d is gradually reduced. When its temperature is at the predetermined "recovery" point, delivery of vapors from tanks 10a or 10b may be made to it by following the procedure described in connection with tank 10c, except that valves 31d and 209 will be manipulated instead of valves 31c and 208, respectively.

With recovery tank 10c full of recovered liquid, steam valve 38c is opened and the tank pressure brought up to a value somewhat greater than 180 lbs. as described in connection with the pressurizing of tank 10d. When it is up to pressure, its charge may be forced through line 50c into manifold 50e in the manner described in connection with the discharge of tank 10d, except that valve 28c will be manipulated in lieu of valve 28d.

The above cycle of operation may be repeated over and over without interruption between cycles. It has been found that the described system is capable of working continuously, efficiently and at relatively low cost, in spite of the acknowledged difficulties of packaging volatile liquids such as "F 12."

While I have described preferred embodiments of my invention, it is to be understood that various changes may be made without departing from the spirit and scope of the appended claims.

I claim:

1. In a closed system for transferring volatile liquid from a supply tank to a receiver, a flow line from the tank to the receiver, and means for maintaining a differential between the tank pressure and the receiver pressure sufficient to force liquid from the tank into the receiver and comprising regulatable means for heating the liquid in the tank to develop a tank pressure sufficiently greater than the receiver pressure to promote liquid flow from the tank to the receiver, and cooling means applied to the liquid in the flow line at a point intermediate the tank and receiver to maintain a predetermined differential between the temperatures of the liquid in the tank and the liquid flowing into the receiver, said heating means embodying a water bath for said supply tank, means for heating the bath, and means controllable by the vapor pressure within the tank for regulating said bath-heating means.

2. In a closed system for transferring volatile liquid from a supply tank to a receiver, a flow line from the tank to the receiver, and means for maintaining a differential between the tank pressure and the receiver pressure sufficient to force liquid from the tank into the receiver and comprising means for heating the liquid in the tank to develop a tank pressure sufficiently greater than the receiver pressure to promote liquid flow from the tank to the receiver, and cooling means applied to the liquid in the flow line at a point intermediate the tank and receiver to maintain a predetermined differential between the temperatures of the liquid in the tank and the liquid flowing into the receiver, said cooling means embodying flowing water applied to a zone of the flow line.

3. In a closed system for transferring volatile liquid from a supply tank to a receiver, a flow line from the tank to the receiver, and means for maintaining a differential between the tank pressure and the receiver pressure sufficient to force liquid from the tank into the receiver and comprising means for heating the liquid in the tank to develop a tank pressure sufficiently greater than the receiver pressure to promote liquid flow from the tank to the receiver, and regulatable cooling means applied to the liquid in the flow line at a point intermediate the tank and receiver to maintain a predetermined differential between the temperatures of the liquid in the tank and the liquid flowing into the receiver, said cooling means embodying flowing water applied to a zone of the flow line, and means controlling the flow of the cooling water.

4. In a closed system for transferring volatile liquid from a supply tank to a receiver, a flow line from the tank to the receiver, and means for maintaining a differential between the tank pressure and the receiver pressure sufficient to force liquid from the tank into the receiver and comprising regulatable means for heating the liquid in the tank to develop a tank pressure sufficiently greater than the receiver pressure to promote liquid flow from the tank to the receiver, and regulatable cooling means applied to the liquid in the flow line at a point intermediate the tank and receiver to maintain a predetermined differential between the temperatures of the liquid in the tank and the liquid flowing into the receiver, said heating means embodying a water bath for said supply tank, means for heating the bath, and means controllable by the condition of the liquid in the supply tank for regulating said bath heating means; and said cooling means embodying flowing water applied to a zone of the flow line, and means controlling the flow of the cooling water.

5. In a closed system for filling a container with volatile liquid from a supply tank, a flow line leading from the tank, a filling head adapted to be releasably applied in vapor-tight relation to a filling opening of the container, a meter having intake communication with the flow line and outlet communication with the filling head, said meter limiting, to a given measured amount, the liquid flow from the flow line to the head, and means for maintaining a differential between the tank pressure and the container pressure sufficient to force liquid from the tank into the container, and comprising means for heating the liquid in the tank to develop a tank pressure sufficiently greater than the container pressure to promote liquid flow from the tank, through the meter and into the container, main cooling means applied to the liquid in the flow line to prevent subsequent equalization of the temperatures of the liquid in the tank and the liquid flowing into the container, and auxiliary cooling means applied to the liquid at the meter and adapted to lower the temperature of the liquid at the meter below the temperature at which the liquid leaves the main cooling means.

6. In a closed system for transferring volatile liquid from a supply tank to a receiver, a flow line from the tank to the receiver, flow-control valvular means near the receiver end of the flow line, and means for maintaining a differential between the tank pressure and the receiver pressure sufficient to force liquid from the tank into the receiver and comprising means for heating the liquid in the tank to develop a tank pressure sufficiently greater than the receiver pressure to promote liquid flow from the tank to the receiver, and regulatable cooling means applied to the liquid in the flow line at a point intermediate the tank and receiver to maintain a predetermined differential between the temperatures of the liquid in the tank and the liquid flowing into the receiver; and means operable by virtue of actuation of said valvular means adapted to regulate said cooling means.

7. In a closed system for transferring volatile liquid from a supply tank to a receiver, a flow line from the tank to the receiver, flow-control valvular means near the receiver end of the flow line, and means for maintaining a differential between the tank pressure and the receiver pressure sufficient to force liquid from the tank into the receiver and comprising means for heating the liquid in the tank to develop a tank pressure sufficiently greater than the receiver pressure to promote liquid flow from the tank to the receiver, and regulatable cooling means applied to the liquid in the flow line at a point intermediate the tank and receiver to maintain a predetermined differential between the temperatures of the liquid in the tank and the liquid flowing into the receiver, said cooling means embodying flowing water applied to a zone of the flow line, and means operable by virtue of actuation of said valvular means adapted to control the flow of the cooling water.

8. In a closed system for filling a receiver with volatile liquid from a supply tank, a filling head adapted for vapor-tight connection with the receiver, a flow line from the tank to the head, means for maintaining a differential between the tank pressure and the receiver pressure sufficient to force liquid from the tank into the receiver and comprising means for heating the liquid in the tank to develop a tank pressure sufficiently greater than the receiver pressure to promote liquid flow from the tank to the receiver, cooling means applied to the liquid in the flow line at a point intermediate the tank and receiver to maintain a predetermined differential between the temperatures of the liquid in the tank and the liquid flowing into the receiver, means for interrupting the flow from the flow line to the receiver, and means operable by actuation of the interrupting means to control, in part, said cooling means.

9. In a closed system for transferring volatile liquid from a supply tank to a receiver, a flow line from the tank to the receiver, and means for maintaining a differential between the tank pressure and the receiver pressure sufficient to force liquid from the tank into the receiver and comprising means for heating the liquid in the tank to develop a tank pressure sufficiently greater than the receiver pressure to promote liquid flow from the tank to the receiver, and regulatable cooling means applied to the liquid in the flow line at a point intermediate the tank and receiver to maintain a predetermined differential between the temperatures of the liquid in the tank and the liquid flowing into the receiver, said cooling means being regulated, in part, by virtue of pressure changes in the liquid in the flow line.

10. In a closed system for transferring volatile liquid selectively from a pair of supply tanks to a receiver, a manifold, a pair of flow lines, one from each tank, adapted to be selectively opened to the manifold, a line leading from the manifold to the receiver, means acting automatically, when a given tank has emptied to a predetermined extent, to open the flow line of the other tank to the manifold, means for maintaining a differential between the tank pressure and the receiver pressure sufficient to force liquid from the selected tank into the receiver and comprising means for simultaneously heating the liquids in the two tanks to develop a tank pressure sufficiently greater than the receiver pressure to promote liquid flow from the tanks to the receiver, and cooling means applied to the line leading from the manifold to maintain a predetermined differential between the temperatures of the liquid in the tanks and the liquid flowing into the receiver.

11. In a closed system for transferring volatile liquid selectively from a pair of supply tanks to a receiver, a manifold, a pair of flow lines, one from each tank, adapted to be selectively opened to the manifold, a line leading from the manifold to the receiver, means for maintaining a differential between the tank pressure and the receiver pressure sufficient to force liquid from the selected tank into the receiver and comprising means for simultaneously heating the liquids in the two tanks to develop a tank pressure sufficiently greater than the receiver pressure to promote liquid flow from the tanks to the receiver, and cooling means applied to the line leading from the manifold to maintain a predetermined differential between the temperatures of the liquid in the tanks and the liquid flowing into the receiver; and means operable by the vapor remaining in a given tank, after the liquid has been emptied therefrom to a predetermined extent, to open the flow line of the other tank to the manifold.

12. In a closed system for transferring volatile liquid selectively from a pair of supply tanks to a receiver, a manifold, a pair of flow lines, one from each tank, adapted to be selectively opened to the manifold, a line leading from the manifold to the receiver, means acting automatically, after a given tank has been emptied of liquid to a predetermined extent, to open the flow line of the other tank to the manifold, means for maintaining a differential between the tank pressure and the receiver pressure sufficient to force liquid from the selected tank into the receiver and comprising means for simultaneously heating the liquids in the two tanks to develop a tank pressure sufficiently greater than the receiver pressure to promote liquid flow from the tanks to the receiver and cooling means applied to the line leading from the manifold to maintain a predetermined differential between the temperatures of the liquid in the tanks and the liquid flow'ng into the receiver; said automatically acting means embodying an auxiliary tank interposed in the flow line of the given supply tank and normally filled by liquid therefrom, a float in the liquid within said auxiliary tank, a control valve in the flow line of the other supply tank, and means whereby the float, in its descent due to a lowering of the liquid level in the auxiliary tank as brought about by the adm'ssion of vapor from the given tank to said auxiliary tank, opens the valve in the flow line of the other supply tank.

13. In a closed system for transferring volatile liquid selectively from a pair of supply tanks to a receiver, a manifold, a pair of flow lines, one from each tank, adapted to be selectively opened to the manifold, a line leading from the manifold to the receiver, means acting automatically, after a given tank has been emptied of liquid to a predetermined extent, to open the flow line of the other tank to the manifold, signal means acting automatically to indicate the condition of interchanged tank-delivery to the manifold, means for maintaining a differential between the tank pressure and the receiver pressure sufficient to force liquid from the selected tank into the receiver and comprising means for simultaneously heating the liquids in the two tanks to develop a tank pressure sufficiently greater than the receiver pressure to promote liquid flow from the tanks to the receiver, and cooling means app'ied to the line leading from the manifold to maintain a predetermined differential between the temperatures of the liquid in the tanks and the liqu'd flowing into the receiver.

14. In combinat'on, a closed system for transferring volati'e liquid from a supply tank to a receiver and including a valve-controlled, liquid flow line extending from the tank to the receiver, means for heating the liquid in the tank to develop predetermined tank pressure, cool'ng means applied to the liquid in the flow line to maintain a differential between the tank pressure and the receiver pressure sufficient to force liquid from the tank into the receiver; a recovery tank, a valve-controlled vapor line from the supply tank to the recovery tank, and cooling means applied to the recovery tank for cooling it to a temperature sufficiently be'ow that of the supply tank to create a differential between the supply tank pressure and the recovery tank pressure sufficient to force vapor from the supply tank into the recovery tank when the vapor line is open and the liquid flow line c'osed.

15. In combination, a closed system for transferring volati'e liqu'd from a supply tank to a receiver and including a valve-controlled, liquid flow line extending from the tank to the receiver, means for heating the liquid in the tank to develop predetermined tank pressure, cooling means applied to the liquid in the flow line to maintain a differential between the tank pressure and the receiver pressure sufficient to force liquid from the tank into the receiver; a recovery tank, a valve-control'ed vapor line from the supp'y tank to the recovery tank, and cooling means applied to the recovery tank for cooling it to a temperature sufficiently below that of the supply tank to create a different'al between the supply tank pressure and the recovery tank pressure sufficient to force vapor from the supply tank into the recovery tank when the vapor line is open and the liquid flow line is closed; a valve-controlled, liquid flow line extending from said recovery tank to said first mentioned flow line at a point between the supply tank and sa'd cooling means; and means for heating said recovery tank, subsequent to the condensation of recovered vapors therein, to create and maintain a differential between the recovery tank pressure and the receiver pressure sufficient to force flow of the recovered liquid from the recovery tank to the receiver through the liquid flow line.

16. In combination, a closed system for transferring volatile liquid from a supply tank to a receiver and including a valve-controlled, liquid flow line extending from the tank to the receiver, means for heating the liquid in the tank to develop a predetermined tank pressure, cooling means applied to the liquid in the flow line to maintain a differential between the tank pressure and the receiver pressure sufficient to force liquid from the tank into the receiver; a recovery tank, cooling means applied to the recovery tank, a valve-controlled vapor line extending from the supply tank to the recovery tank, a pump in said vapor line for withdrawing vapor from the supply tank and forcing it into the recovery tank; a valve-controlled, liquid flow line extending from said recovery tank to said first mentioned flow line at a point between the supply tank and said cooling means; and means for heating said recovery tank, subsequent to the condensation of recovered vapors therein, to create and maintain a differential between the recovery tank pressure and the receiver pressure sufficient to force flow of the recovered liquid from the recovery tank to the receiver through the liquid flow lines.

17. In combination, a closed system for transferring volatile liquid from a supply tank to a rece'ver and including a valve-controlled, liquid flow line extending from the tank to the receiver, means for heating the liquid in the tank to develop predetermined tank pressure, cooling means applied to the liquid in the flow line to ma'ntain a differential between the tank pressure and the receiver pressure sufficient to force liquid from the tank into the receiver; a recovery tank, a valve-controlled vapor line from the supply tank to the recovery tank, and cooling means applied to the recovery tank for cooling it to a temperature sufficiently below that of the supply tank to create a differential between the supply tank pressure and the recovery tank pressure suffic'ent to force vapor from the supply tank into the recovery tank when the vapor line is open and the liquid flow line is closed, a pump in said vapor line for withdrawing vapor remaining in the supply tank and forc'ng it into the recovery tank; a valve-controlled. liquid flow line extending from said recovery tank to said first mentioned flow line at a point between the supply tank and said cooling means; and means for heating said recovery tank, subsequent to the condensation of recovered vapors there'n, to create and maintain a differential between the recovery tank pressure and the receiver pressure sufficient to force flow of the recovered liquid from the recovery tank to the receiver through the liquid flow lines.

18. In a closed system for transferring volatile liquid from a supply tank to a rece'ver, a flow line from the tank to the receiver, and means for maintaining a differential between the tank pressure and the receiver pressure sufficient to force liquid from the tank into the receiver and comprising regulatable means for heating the liquid in the tank to develop a tank pressure sufficiently greater than the receiver pressure to promote liquid flow from the tank to the receiver, and cooling means applied to the liquid in the flow line at a point intermediate the tank and receiver to maintain a predetermined differential between the temperatures of the liquid in the tank and the liquid flowing into the receiver, said heating means embodying a regulatable heating element applied externally to the supply tank, and means controllable by the vapor pressure within the tank for regulating said heating element.

19. In a closed system for transferring volatile liquid from a supply tank to a receiver, a flow line from the tank to the receiver, and means for maintaining a differential between the tank pressure and the receiver pressure sufficient to force liquid from the tank into the receiver and comprising means for heating the liquid in the tank to develop a tank pressure sufficiently greater than the receiver pressure to promote liquid flow from the tank to the receiver, and cooling means applied to the liquid in the flow line at a point intermediate the tank and receiver to maintain a predetermined differential between the temperatures of the liquid in the tank and the liquid flowing into the receiver, said cooling means embodying flowing water applied to a zone of the flow line, the direction of flow of the water being counter to that of the liquid in the flow line.

REUBEN STANLEY SMITH.

REFERENCES CITED

The following references are of record in the file of this patent:

UNITED STATES PATENTS

| Number | Name | Date |
|---|---|---|
| 1,629,174 | Patton | May 17, 1927 |
| 2,007,251 | Kniskern | July 9, 1935 |
| 2,062,181 | Klaus | Nov. 24, 1936 |
| 2,067,720 | McCombs et al. | Jan. 12, 1937 |
| 2,075,408 | Sholes | Mar. 30, 1937 |
| 2,346,253 | De Motte | Apr. 11, 1944 |
| 2,400,037 | Arndt et al. | May 7, 1946 |